US006853791B2

(12) United States Patent
Sigalas

(10) Patent No.: US 6,853,791 B2
(45) Date of Patent: Feb. 8, 2005

(54) WAVEGUIDE BENDS AND SPLITTERS IN SLAB PHOTONIC CRYSTALS WITH NONCIRCULAR HOLES

(75) Inventor: Mihail M. Sigalas, Santa Clara, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 215 days.

(21) Appl. No.: 10/285,648

(22) Filed: Oct. 31, 2002

(65) Prior Publication Data

US 2004/0008945 A1 Jan. 15, 2004

Related U.S. Application Data

(63) Continuation-in-part of application No. 10/192,300, filed on Jul. 10, 2002, now Pat. No. 6,728,457.

(51) Int. Cl.[7] .............................................. G02E 6/10
(52) U.S. Cl. ..................... 385/129; 385/125; 385/15; 385/27; 385/30; 359/245; 359/321; 359/322
(58) Field of Search ............................... 385/2, 15, 16, 385/24, 27, 28, 31, 45, 50, 125, 129–131, 142, 146; 359/245, 321–322, 326, 344, 803; 372/108, 39, 46, 50, 64

(56) References Cited

U.S. PATENT DOCUMENTS

| | | | | |
|---|---|---|---|---|
| 6,274,293 B1 | * | 8/2001 | Gupta et al. | 430/315 |
| 6,555,406 B1 | * | 4/2003 | Leung et al. | 438/22 |
| 6,560,006 B2 | * | 5/2003 | Sigalas et al. | 359/321 |
| 6,593,894 B1 | * | 7/2003 | Biswas et al. | 343/793 |
| 6,631,236 B2 | * | 10/2003 | Yamada | 385/129 |
| 6,643,439 B2 | * | 11/2003 | Notomi et al. | 385/125 |
| 6,674,949 B2 | * | 1/2004 | Allan et al. | 385/129 |
| 6,687,447 B2 | * | 2/2004 | Flory et al. | 385/129 |
| 6,690,876 B2 | * | 2/2004 | Sigalas | 385/146 |
| 2002/0118941 A1 | * | 8/2002 | Notomi et al. | 385/129 |
| 2002/0159126 A1 | * | 10/2002 | Sigalas et al. | 359/245 |
| 2002/0159733 A1 | * | 10/2002 | Flory et al. | 385/125 |
| 2002/0191933 A1 | * | 12/2002 | Tokushima | 385/129 |
| 2003/0174993 A1 | * | 9/2003 | Tomaru | 385/129 |
| 2003/0202764 A1 | * | 10/2003 | Lee et al. | 385/129 |
| 2004/0001683 A1 | * | 1/2004 | Lau et al. | 385/129 |
| 2004/0008962 A1 | * | 1/2004 | Sigalas et al. | 385/129 |

OTHER PUBLICATIONS

Johnson, S. G. et al., "Linear Waveguides in Photonic–Crystal Slabs", Physical ReviewB, vol. 60, No. 12, Sep. 15, 2000, pp. 8212–8221.

Johnston, S. G. et al., "Guided Modes in Photonic Crystal Slabs", Physical Review B, vol. 60, No. 8, Aug. 15, 1999, pp. 5751–5758.

Loncar, Marko et al., "Waeguiding in Planar Photonic Crystals", Applied Physics Letters, vol. 77, No. 13, Sep. 13, 2000, pp. 1937–1939.

* cited by examiner

*Primary Examiner*—John R. Lee
*Assistant Examiner*—David A. Vanore
(74) *Attorney, Agent, or Firm*—Juergen Krause-Polstorff

(57) ABSTRACT

A two-dimensional photonic crystal slab apparatus having a waveguiding capability is provided. Noncircular holes are introduced to replace the circular holes in the two-dimensional lattice of the photonic crystal to provide waveguiding capability. Waveguide bends and splitter using noncircular holes with high transmittances are described for symmetry planes of the two dimensional lattice structure.

20 Claims, 51 Drawing Sheets

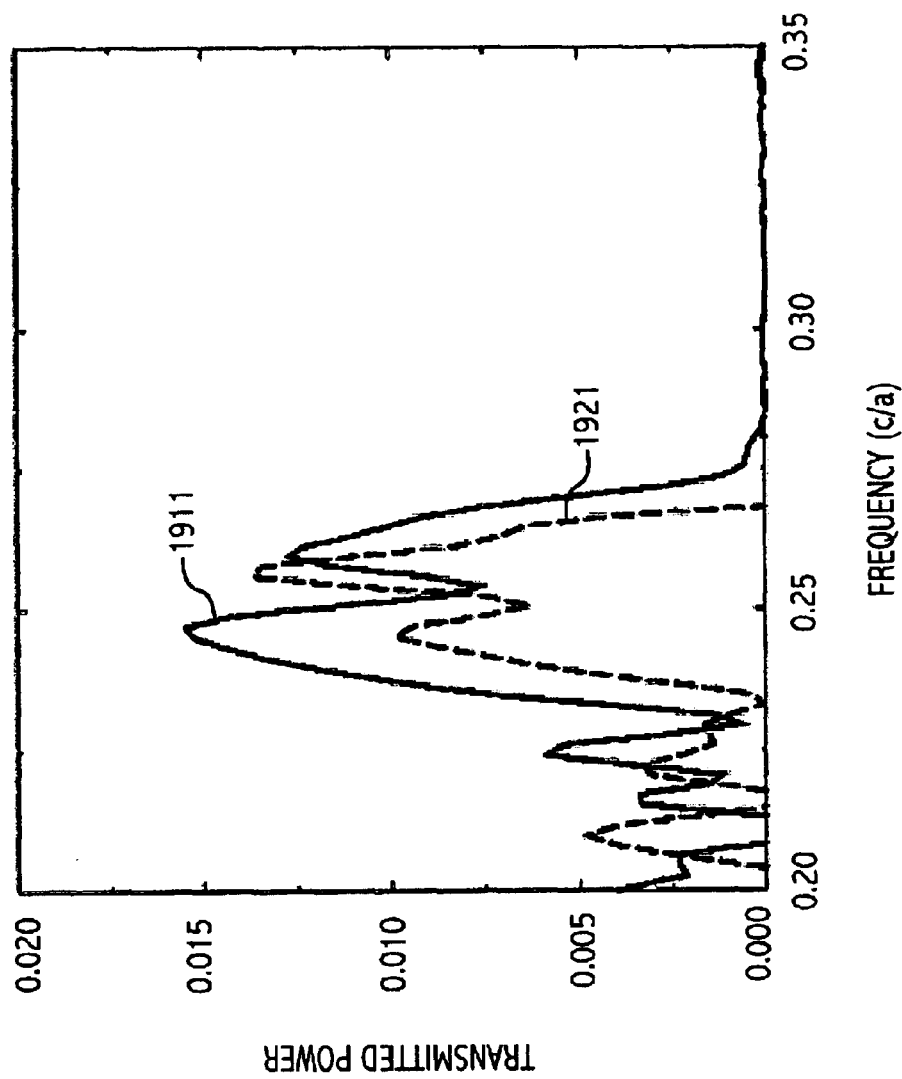

WAVEGUIDE BENDS AND SPLITTERS IN SLAB PHOTONIC CRYSTALS WITH NONCIRCULAR HOLES

CROSS REFERENCE TO RELATED APPLICATIONS

This application is a Continuation-in-Part of U.S. patent application Ser. No. 10/192,300 filed Jul. 10, 2002 now U.S. Pat. No. 6,728,457.

FIELD OF INVENTION

The present invention relates generally to the field of photonic crystals and more particularly to two-dimensional photonic crystal apparatus.

BACKGROUND OF INVENTION

Photonic crystals (PC) are periodic dielectric structures which can prohibit the propagation of light in certain frequency ranges. Photonic crystals have spatially periodic variations in refractive index and with a sufficiently high contrast in refractive index, photonic bandgaps can be opened in the structure's optical spectrum. The "photonic bandgap" is the frequency range within which propagation of light through the photonic crystal is prevented. A photonic crystal that has spatial periodicity in three dimensions can prevent light having a frequency within the crystal's photonic bandgap from propagating in any direction. However, fabrication of such a structure is technically challenging. A more attractive alternative is to utilize photonic crystal slabs that are two-dimensionally periodic dielectric structures of finite height that have a band gap for propagation in the plane and use index-confinement in the third dimension. In addition to being easier to fabricate, two-dimensional photonic crystal slabs provide the advantage that they are compatible with the planar technologies of standard semiconductor processing.

An example of a two-dimensional photonic crystal structure periodic in two dimensions and homogeneous in the third may be fabricated from a bulk material having a periodic lattice of circular air filled columns extending through the bulk material in the height direction and periodic in the planar direction. The propagation of light in two-dimensional photonic crystals is determined by a number of parameters, including radius of the cylindrical columns, the lattice spacing, the symmetry of the lattice and the refractive indices of the bulk and column material.

Introducing defects in the periodic structure of a photonic crystal allows the existence of localized electromagnetic states that are trapped at the defect site and that have resonant frequencies within the bandgap of the surrounding photonic crystal material. By providing a line of such defects in the photonic crystal, a waveguiding structure is created that can be used in the control and guiding of light (see, for example, J. D. Joannopoulos, R. D. Meade, and J. N. Winn, "Photonic Crystals", Princeton University Press, Princeton, N.J., 1995). Light of a given frequency that is prevented from propagating in the photonic crystal may propagate in the defect region.

A two-dimensional photonic crystal slab waveguide usually comprises a two-dimensional periodic lattice in the form of an array of dielectric rods or air holes incorporated in a slab body. High guiding efficiency can be achieved only in a narrow frequency region close to the upper or lower edge (for dielectric rods or air holes, respectively) of the waveguide band, where there are no leaky modes. Typically, high guiding efficiency is achieved only in a narrow frequency region that is only a few percent of the center frequency of the waveguide band and existing configurations suffer from low group velocities in the allowed waveguide band. Low group velocity increases the unwanted effects of disorder and absorption.(see S. G. Johnson, S. Fan, P. R. Villeneuve, L. Kolodziejski and J. D. Joannopoulos, Phys. Rev. B 60, 5751, 1999 and S. G. Johnson, P. R. Villeneuve, S. Fan and J. D. Joannopoulos, Phys. Rev. B 62, 8212, 2000).

FIG. 1 shows an xy view of prior art two-dimensional photonic crystal slab apparatus 100. Photonic crystal slab 115 has circular holes 110 arranged to from a periodic triangular lattice with a lattice spacing equal to a. Circular holes 110 are filled with air. Region of defects 125 is created by replacing circular holes 110 of the lattice with larger circular holes 120 along a line in the x direction. Ridge waveguide 175 couples light into photonic crystal slab apparatus 100 that may have its edge at line A', line B' or line C' in FIG. 1.

FIG. 2 shows the transmission coefficient for two-dimensional crystal slab apparatus 100 as a function of frequency expressed in fractions of c/a where cis the speed of light and a is the lattice spacing. The radius for circular holes 120 is about 0.45a and the radius for circular holes 110 is about 0.3a. Curve 210 represents the unguided case which has low transmission in the bandgap and high transmission in the allow band. Curve 201 represents the case where ridge waveguide 175 is attached to photonic crystal slab 115 at the edge defined by line A in FIG. 1. Curve 202 represents the case where ridge waveguide 175 is connected to photonic crystal slab 115 at the edge defined by line B in FIG. 1. Curve 203 represents the case where ridge waveguide 175 is connected to photonic crystal slab 115 at the edge defined by line C' in FIG. 2. The transmission for curve 203 is a maximum for a frequency of about 0.253c/a and the waveguide band is narrow. Increasing the radius of circular holes 120 to 0.5a causes circular holes 120 to touch and start to overlap. This results in rapid deterioration of the transmission properties of two-dimensional crystal slab apparatus 100 as the light wave becomes less confined due to the decrease of the average dielectric constant of two-dimensional crystal slab 100.

SUMMARY OF INVENTION

In accordance with the invention, waveguide bends and splitters having good transmissivity are constructed using elliptical or rectangular holes in slab photonic crystals. A typical lattice structure for the photonic crystal is triangular.

BRIEF DESCRIPTION OF THE DRAWINGS

FIG. 10b shows an e-beam resist mask layer applied to the initial structure of FIG. 10a.

FIG. 11b shows an e-beam resist layer applied to the initial structure of FIG. 10a.

FIG. 17c shows a transmission versus frequency graph for a two-dimensional photonic crystal slab apparatus in accordance with the invention.

FIG. 17d shows a transmission versus frequency graph for a two-dimensional photonic crystal slab apparatus in accordance with the invention.

FIG. 19c shows a transmission versus frequency graph for a two-dimensional photonic crystal slab apparatus in accordance with the invention.

DETAILED DESCRIPTION OF THE INVENTION

Figure 3:
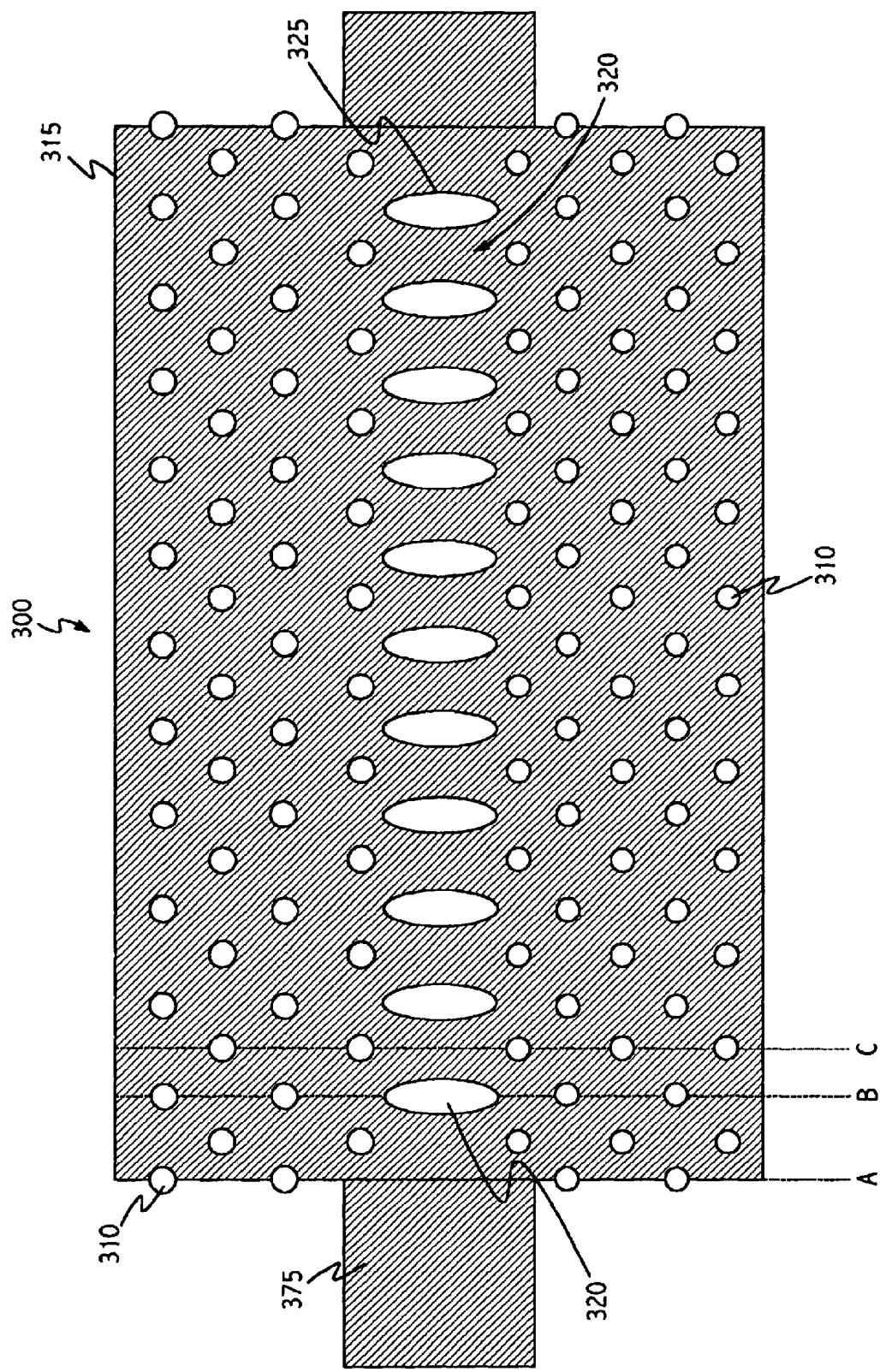
FIG. 3 shows a view of a two-dimensional photonic crystal slab apparatus in accordance with the invention.

FIG. 3 shows the xy view of typical two-dimensional photonic crystal slab apparatus 300 in an embodiment in accordance with the invention. Photonic crystal slab 315 has circular holes 310 arranged to form a periodic triangular lattice. A periodic honeycomb lattice may also be used. Circular holes 310 are etched through photonic crystal slab 315 and are typically filled with a low dielectric constant material such as air. A high dielectric contrast is typically required to open a bandgap in the xy plane. In accordance with the invention, region of defects 325 is created by replacing circular holes 310 of the lattice with elliptical holes 320 along a line, for example, in the x direction. Elliptical holes 320 are typically filled with the same dielectric material as circular holes 110. Ridge waveguide 375 couples light into photonic crystal slab apparatus 300 that may have its edge at line A, line B or line C in FIG. 3.

Figure 1:
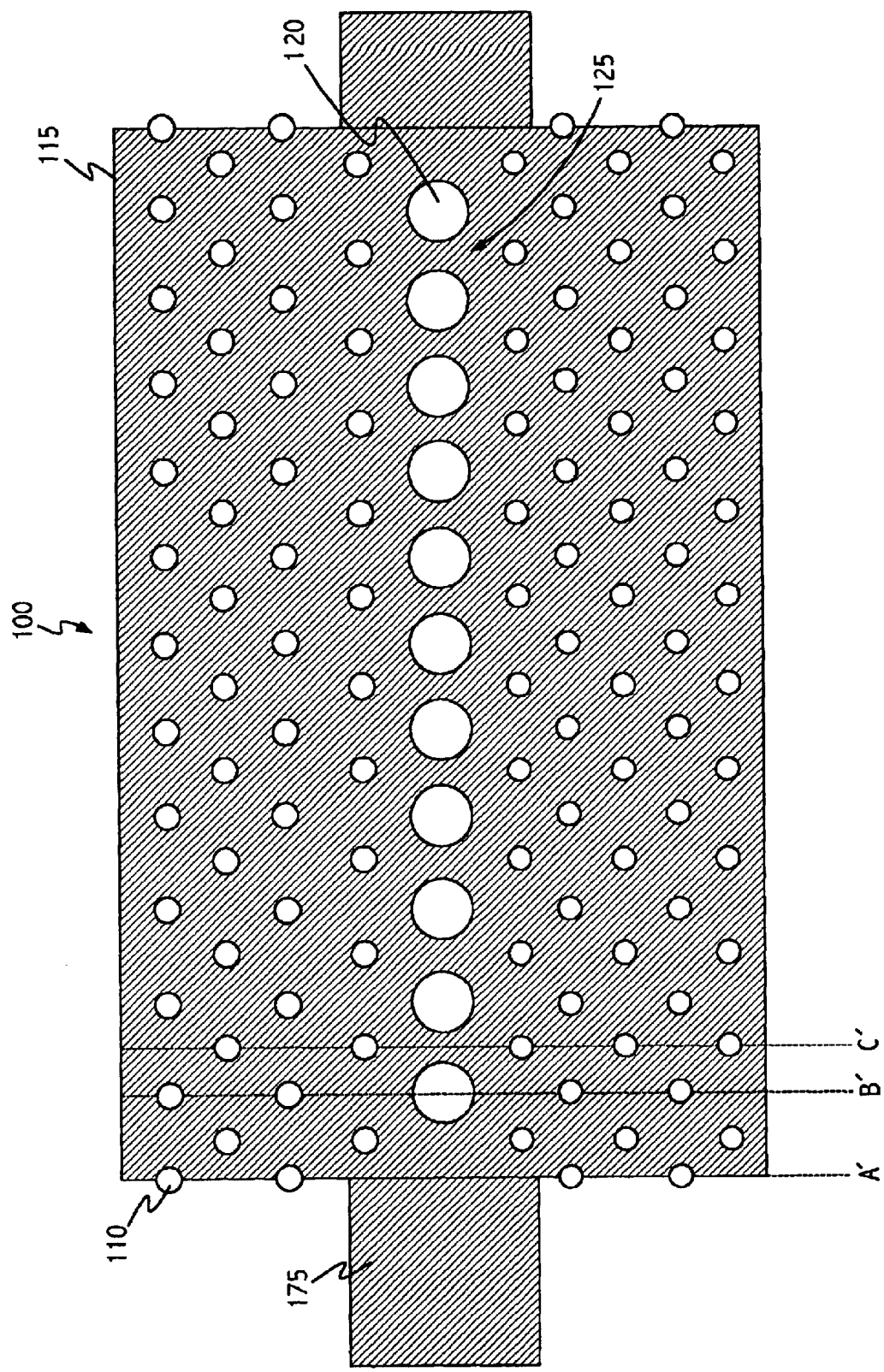
FIG. 1 shows a view of a prior art two-dimensional photonic crystal slab apparatus.
Figure 2:
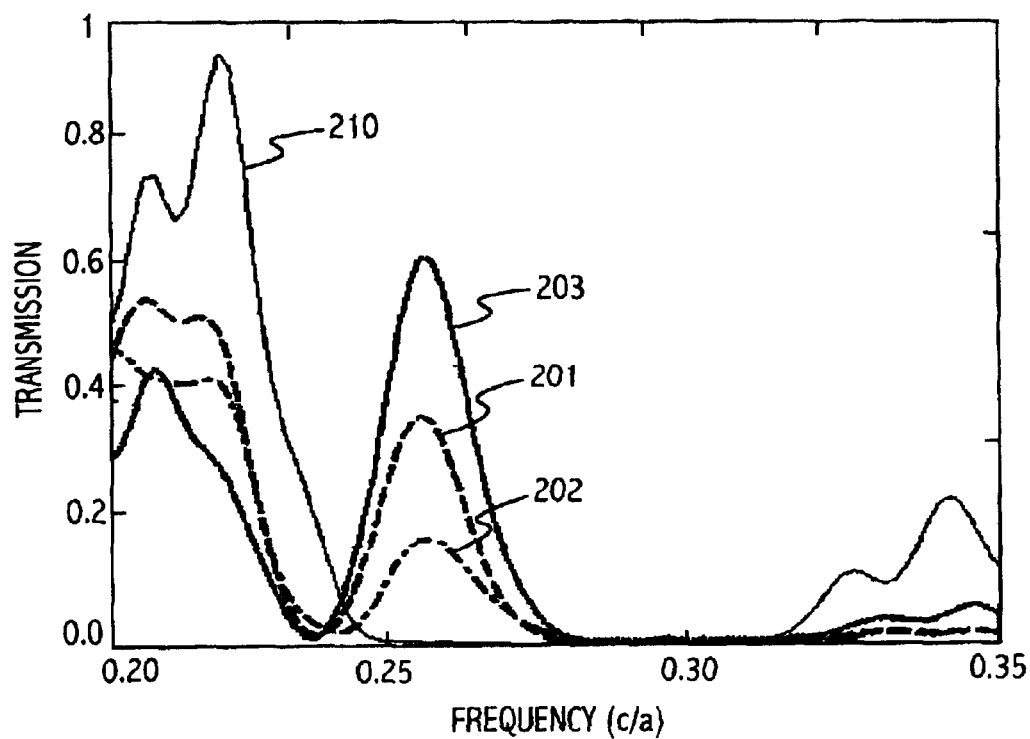
FIG. 2 shows a transmission versus frequency graph for the prior art apparatus of FIG. 1.
Figure 4:
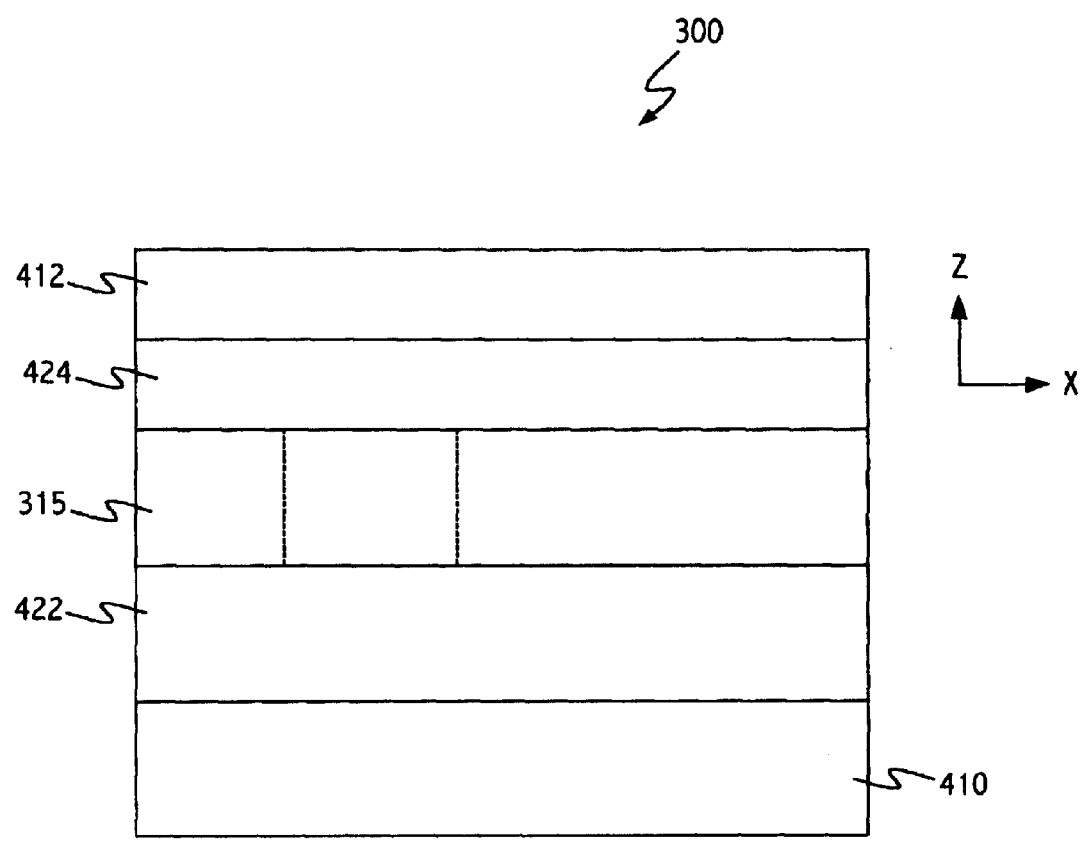
FIG. 4 shows a side view of a two-dimensional photonic crystal slab apparatus in accordance with the invention.

FIG. 4 shows an xz cross-sectional view of photonic crystal slab apparatus 300. Photonic crystal slab 315 is sandwiched between cladding layer 422 and cladding layer 424. Typically, cladding layer 422 is positioned between substrate layer 410 and photonic crystal slab 315 (see FIG. 2). Typically, photonic crystal slab 315 is made from a material having a high dielectric constant compared to air such as silicon or a III–V based semiconductor. To provide index confinement in the z direction, cladding layers 422 and 424 are typically $SiO_2$ or other material having a lower dielectric than the material of photonic crystal slab 315. Substrate layer 410 is typically of the same material as photonic crystal slab 315 to provide mechanical support but may also be air. Layer 412 positioned over cladding layer 424 is typically air.

Photonic crystal slab apparatus 300 is capable of transmitting light having a frequency that lies within the bandgap of photonic crystal slab 315 in a straight line. The waveguide band for photonic crystal slab apparatus 300 depends on a number of factors. Increasing the thickness of photonic crystal slab 315 while keeping all other parameters constant increases the effective dielectric constant and shifts the waveguide band of photonic crystal slab apparatus 300 to lower frequencies. Increasing the cross-section of circular holes 310 while keeping all other parameters constant decreases the effective dielectric constant and shifts the waveguide band of photonic crystal slab apparatus 300 to higher frequencies.

Increasing the thickness of cladding layers 422 and 424 shifts the position of the waveguide band. If layers 412 and 410 are air, increasing the thickness of cladding layers 422 and 424 slowly moves the position of the waveguide band to lower frequencies and saturates where further increases in thickness produce no further shift in waveguide band position. On the other hand, if layer 410 is not air but, for example, silicon, the position of the waveguide band moves to higher frequencies as cladding layers 422 are increased in thickness and saturates where further increases in thickness produce no further shift in waveguide band position.

A finite difference time domain method is used to simulate the performance of photonic crystal slab apparatus 300. In the simulation, ridge waveguide 375 couples the light into photonic crystal slab 315. Photonic crystal slab is taken to have a typical thickness of about 0.6 a. A complete line of circular holes 310 is removed along the x direction and replaced by elliptical holes 320. For calculations, the lattice constant is fixed. For example, if a waveguide band is theoretically indicated to exist at a value of about $a/\lambda=0.26$ and the wavelength to be transmitted is about 1.55 microns then the lattice constant a is chosen to be about 0.4 microns. In the calculations, a dielectric slab of thickness of 0.6a and dielectric constant of 12.96 is used. The slab is placed on top of a semi-infinite thick material of dielectric constant of 2. The ridge waveguide used to couple light to the photonic crystal is 2.28a wide.

Figure 5:
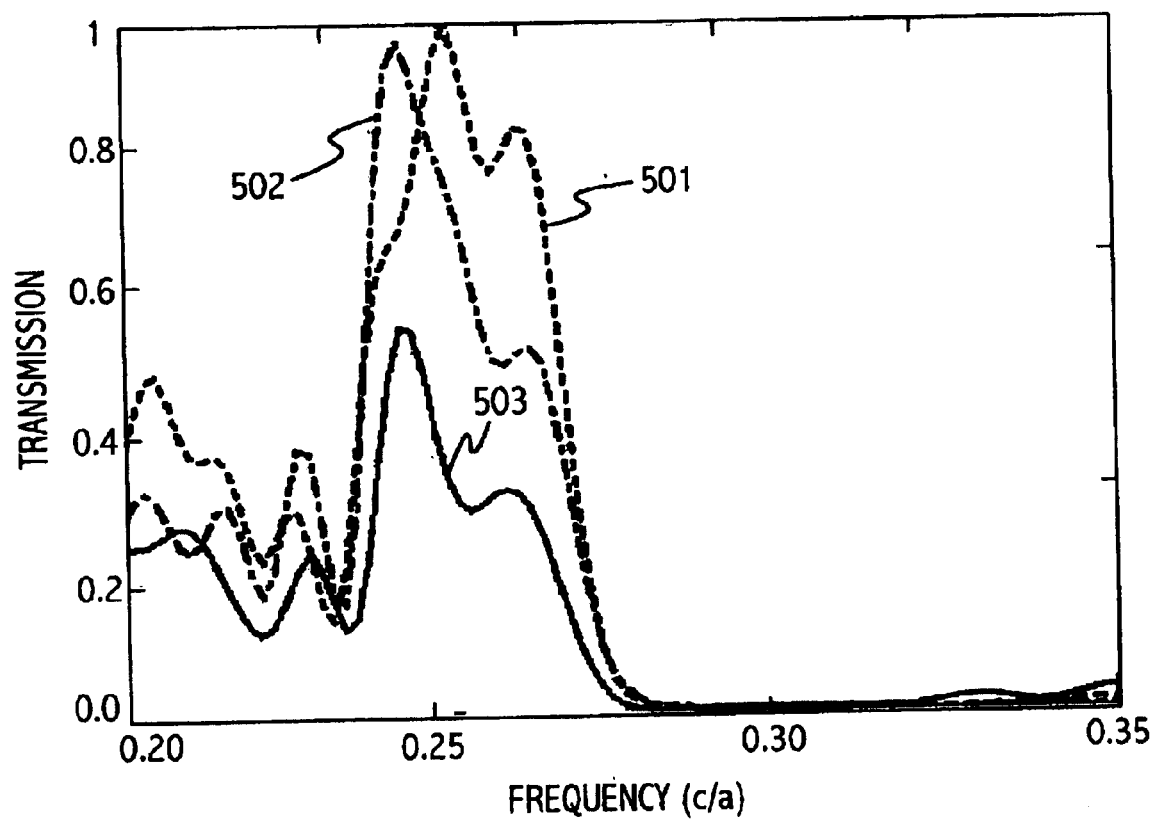
FIG. 5 shows a transmission versus frequency graph for a two-dimensional photonic crystal slab apparatus in accordance with the invention.

For the plots shown in FIG. 5, elliptical holes 320 have semiminor axis of about 0.33a and a semimajor axis of about 0.74a where a is the lattice constant. Circular holes 310 have a radius of about 0.3a . Curve 501 shows transmission versus frequency for the case where ridge waveguide 375 contacts photonic crystal slab 315 at the left edge defined by line A (see FIG. 3). Curve 502 shows transmission versus frequency for the case where ridge waveguide 375 contacts photonic crystal slab 315 at a left edge defined by line B (see FIG. 3). Curve 503 shows transmission versus frequency for the case where ridge waveguide 375 contacts photonic crystal slab 315 at a left edge defined by line C (see FIG. 3). It is apparent from the plots in FIG. 5 that it is not desirable to couple to photonic crystal slab 315 along an edge defined by line C for the case of elliptical holes having a minor axis of about 0.33a. The choice of whether to couple ridge waveguide 375 at line A or line B depends on the frequency of the light to be transmitted.

For frequencies in a narrow band less than about 0.245c/a, curve 502 indicates bettertransmission, while curve 501 indicates better transmission for frequencies between about 0.25c/a to about 0.275c/a. For all the cases in FIG. 5, left and right interface between the ridge waveguide and the photonic crystal are the same.

Figure 6A:
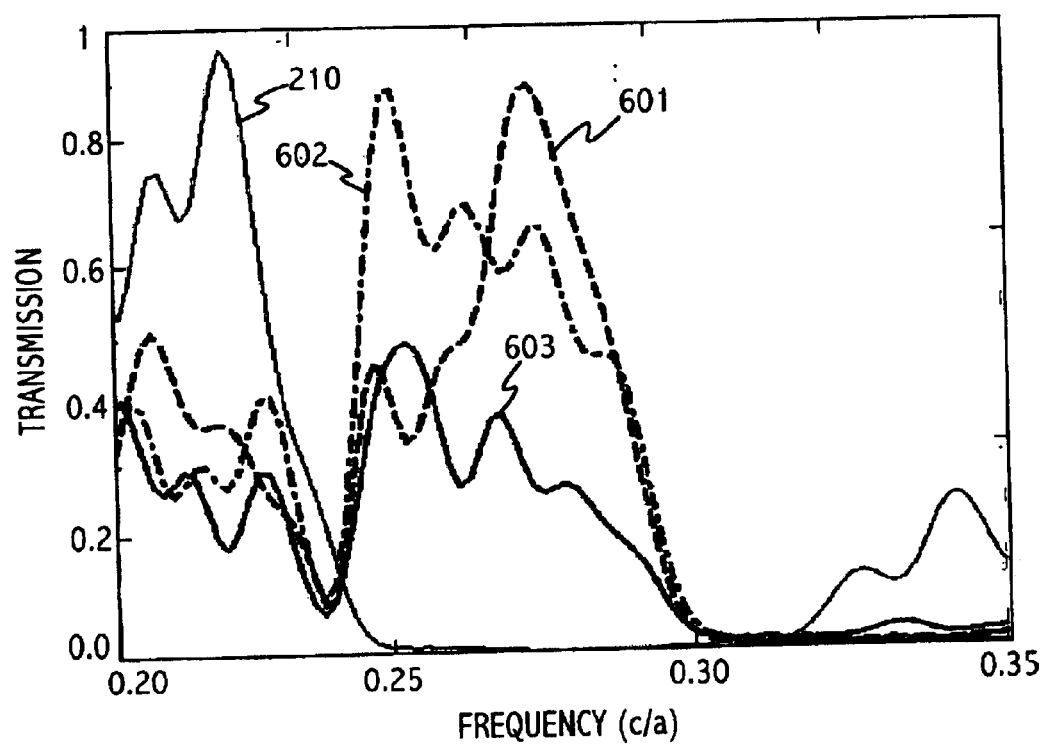
FIG. 6a shows a transmission versus frequency graph for a two-dimensional photonic crystal slab apparatus in accordance with the invention.

For the plots shown in FIG. 6a, elliptical holes 320 have a semiminor axis of about 0.37a and a semimajor axis of about 0.738a where a is the lattice constant. Circular holes 310 have a radius of about 0.3a. The width of the waveguide band is about 0.176 of the mid-band frequency. Curve 601 shows transmission versus frequency for the case where ridge waveguide 375 contacts photonic crystal slab 315 at the left edge defined by line A (see FIG. 3) and provides a maximum transmission of about 0.89 at the lower edge of the waveguide band. Curve 602 shows transmission versus frequency for the case where ridge waveguide 375 contacts photonic crystal slab 315 at a left edge defined by line B (see FIG. 3) and provides a maximum transmission of about 0.89 at the upper edge of the waveguide band. Curve 603 shows transmission versus frequency for the case where ridge waveguide 375 contacts photonic crystal slab 315 at a left edge defined by line C (see FIG. 3) and provides a maximum transmission of about 0.5. It is apparent from the plots in FIG. 6a that it is not advantageous to couple to photonic crystal slab 315 along an edge defined by line C for the case of elliptical holes 320 having a minor axis of about 0.37a as this typically provides low transmission.

Coupling ridge waveguide 375 at line B provides a transmission coefficient greater than about 0.5 in the frequency band from about 0.24c/a to about 0.28c/a. Coupling ridge waveguide 375 at line A provides a transmission coefficient greater than about 0.5 in the frequency band from about 0.26c/a to about 0.285c/a. Coupling ridge waveguide 375 at line C provides a tranmission coefficient of about 0.5 or less for all frequencies of interest as shown by curve 603.

Figure 6B:
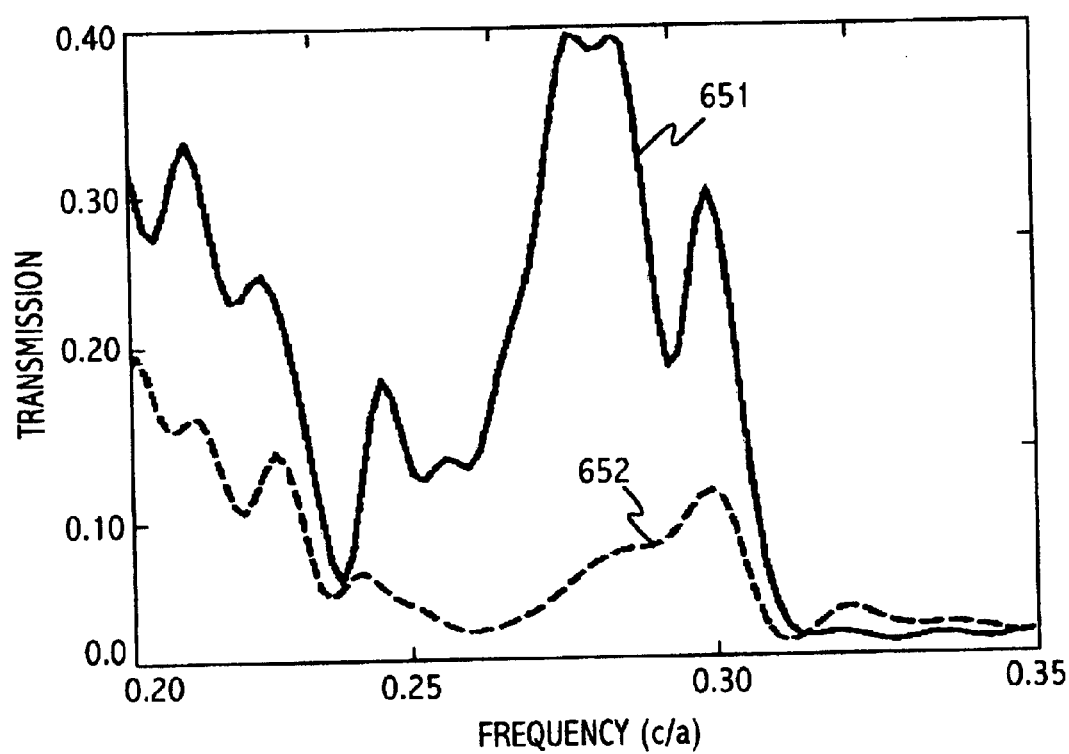
FIG. 6b shows a transmission versus frequency graph for a two-dimensional photonic crystal slab apparatus in accordance with the invention.

FIG. 6b shows the negative effect on transmission that occurs when elliptical holes 320 contact and overlap circular holes 310. Curve 651 shows the transmission for elliptical holes 320 with a semiminor axis of about 0.39a and a semimajor axis of about 0.872a. Curve 652 shows the transmission for elliptical holes 320 with a semiminor axis of about 0.41a and a semimajor axis of about 0.917a. In both cases, elliptical holes 320 contact and overlap circular holes 310. As the overlap between elliptical holes 320 and circular holes 310 increases (as the semiminor axis increases) it is apparent that transmission drops off rapidly due to decreased confinement of the wave.

Figure 6C:
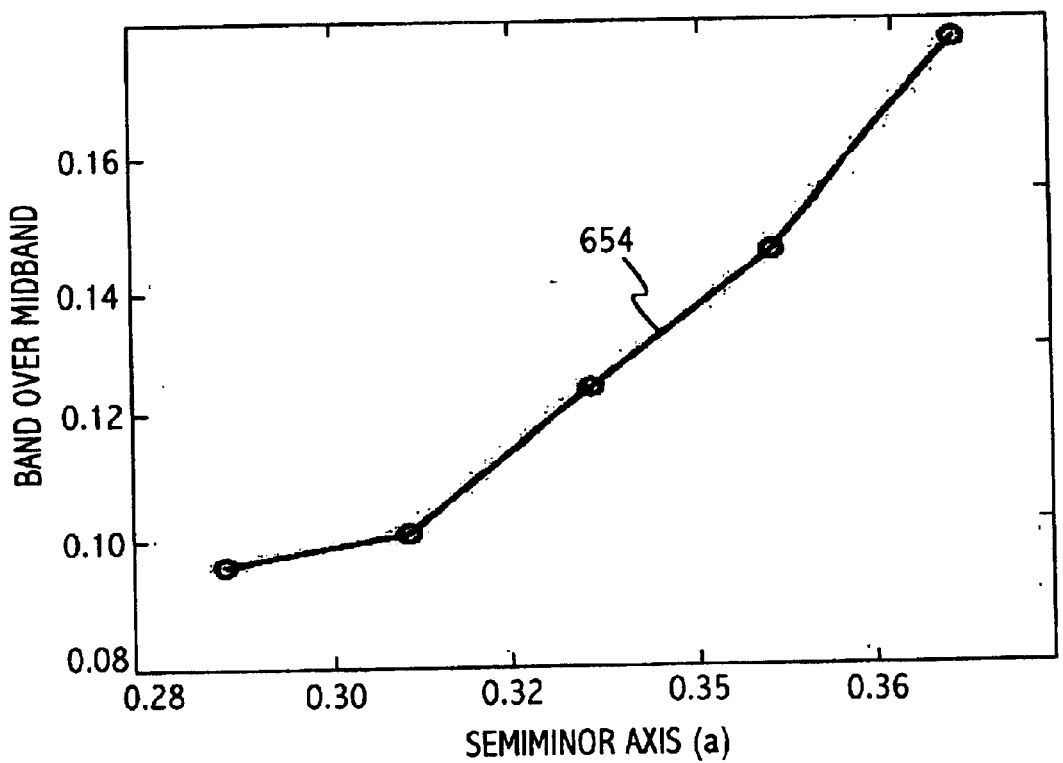
FIG. 6c shows a band over midband versus semiminor axis graph for an embodiment in accordance with the invention.

FIG. 6c shows the width of the waveguide band over the mid-band frequency versus the semiminor axis in units of the lattice constant, a with the ratio of the major axis to the minor axis fixed at about 2.236 for elliptical holes 320. Curve 654 shows that the maximum width of the mid-band frequency is about 0.176.

Figure 6D:
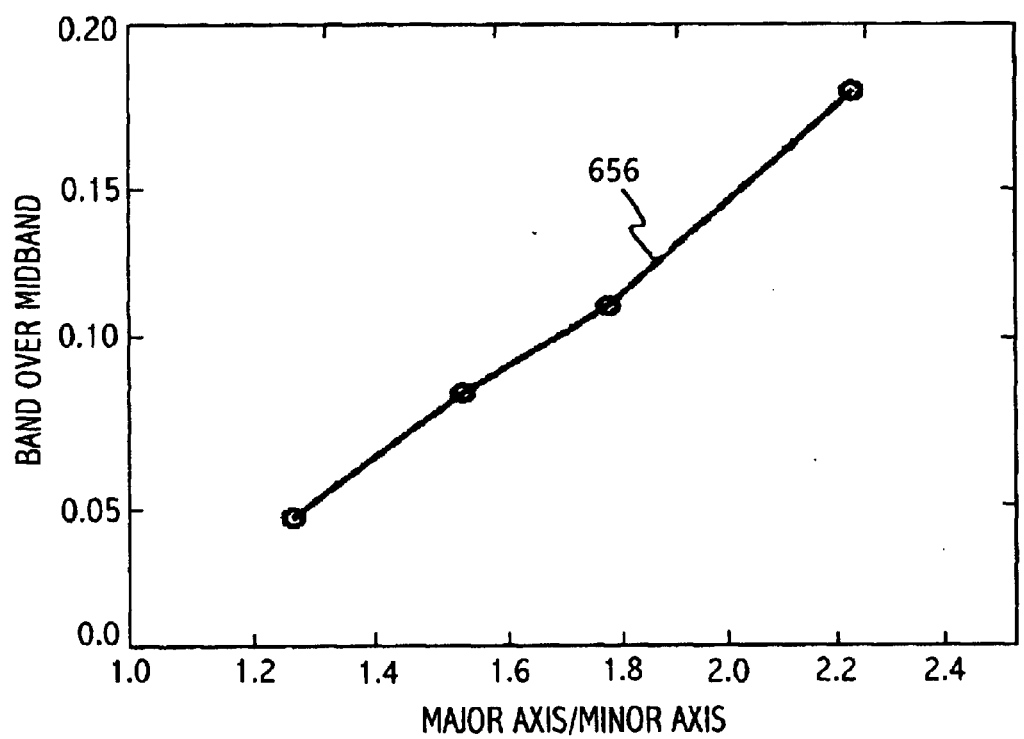
FIG. 6d shows a band over midband versus major axis to minor axis ratio for an embodiment in accordance with the invention.

FIG. 6d shows the width of the waveguide band over mid-band frequency versus the ratio of the major axis to the minor axis where the semiminor axis is fixed at about 0.37a. Increasing the ratio of the major axis to the minor axis increases the bandwidth as shown by curve 656. In both FIGS. 6c and 6d, after the maximum bandwidth shown is reached, the transmission of photonic crystal slab apparatus 300 will decrease rapidly as elliptical holes 320 begin to overlap with circular holes 310 as indicated, for example, in FIG. 6b.

Figure 7:
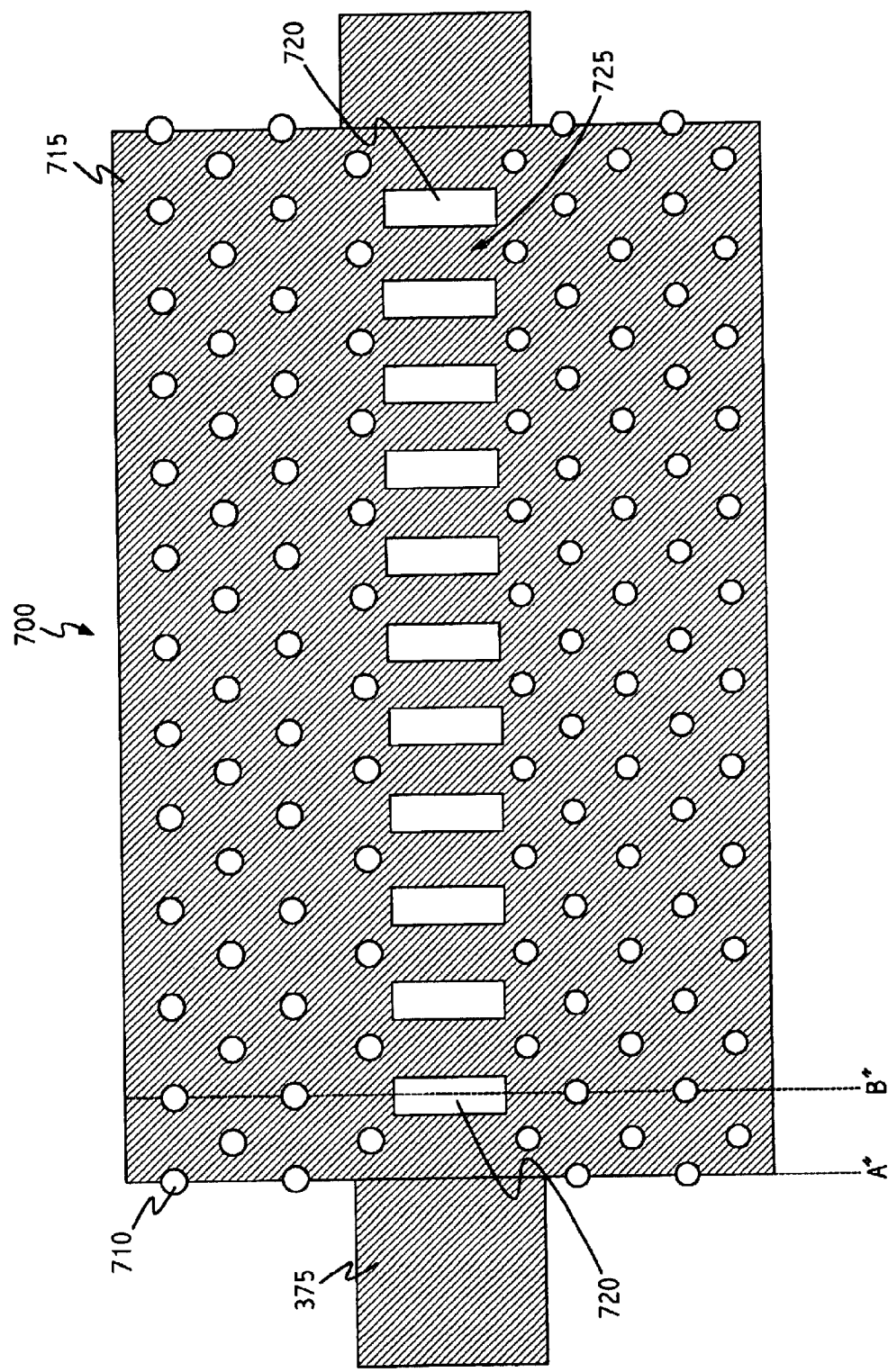
FIG. 7 shows a view of a two-dimensional photonic crystal slab apparatus in accordance with the invention.
Figure 8A:
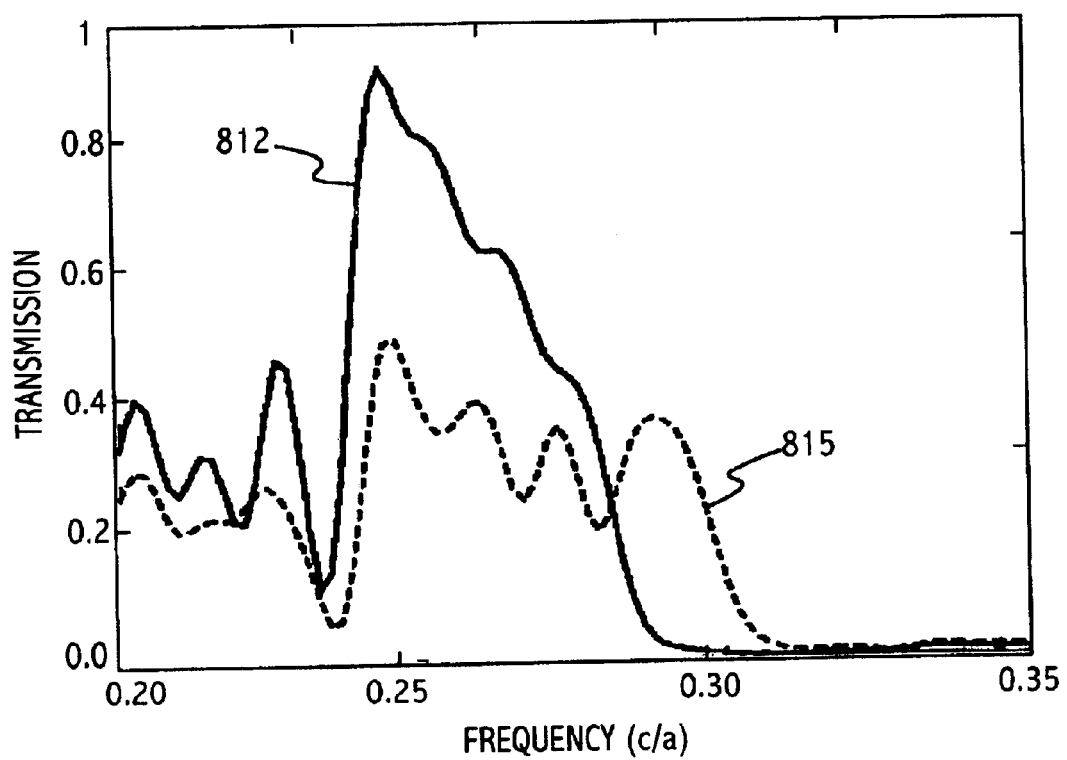
FIG. 8a shows a transmission versus frequency diagram for a two-dimensional photonic crystal slab apparatus in accordance with the invention.

The present invention is not limited to using elliptically shaped holes. For example, in accordance with an embodiment of the invention, elliptical holes 320 may be replaced by rectangles 720 to make photonic crystal slab apparatus 700 as shown in FIG. 7. Circular holes 710 have a radius of 0.3a. FIG. 8a shows transmission versus frequency for ridge waveguide 375 coupled to photonic crystal slab 715 along the edge defined by line B" in FIG. 8a for both curves 812 and 815. Curve 812 shows transmission versus frequency for rectangles 720 having a short side of length of about 0.58a and a long side of length about 1.3a. Curve 815 shows transmission versus frequency for rectangles 720 having a short side of about 0.62a and a long side of about 1.38a. Transmission for curve 815 is worse because rectangles 720 start to touch and overlap with circular holes 710.

Figure 8B:
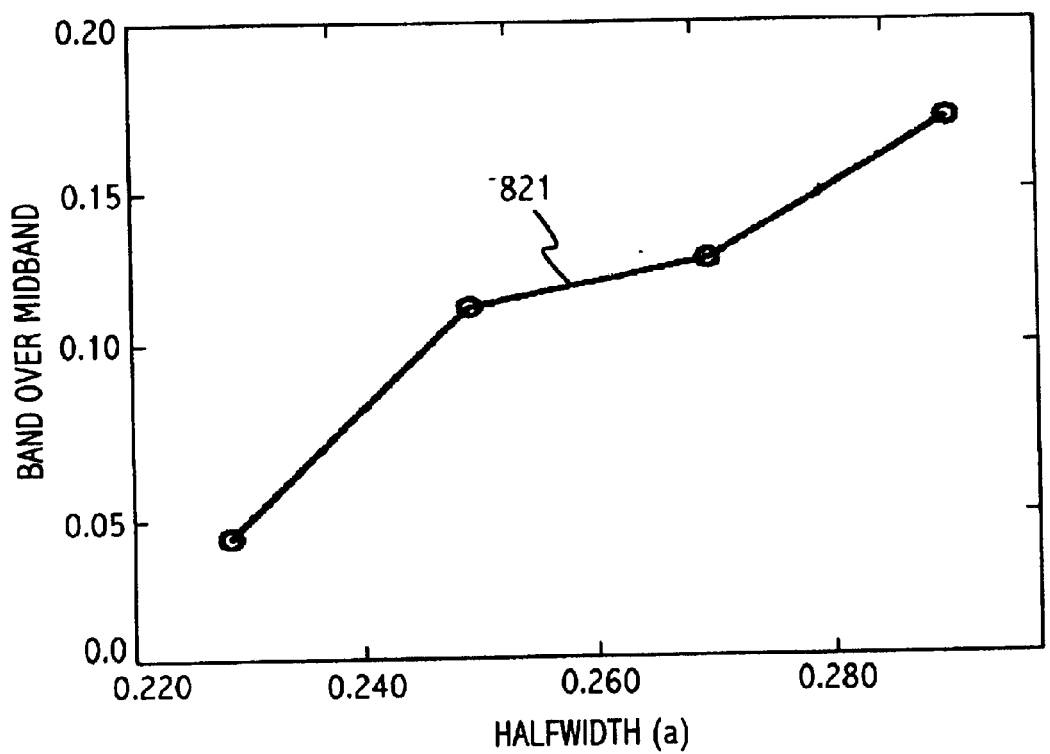
FIG. 8b shows a band over midband versus halfwidth graph for an embodiment in accordance with the invention.

FIG. 8b shows the width of the waveguide band over mid-frequency versus the half-width of rectangle 720 in units of the lattice constant, a with the ratio of rectangle length to width fixed at about 2.236. As curve 821 shows, the maximum bandwidth is about 0.164.

Figure 8C:
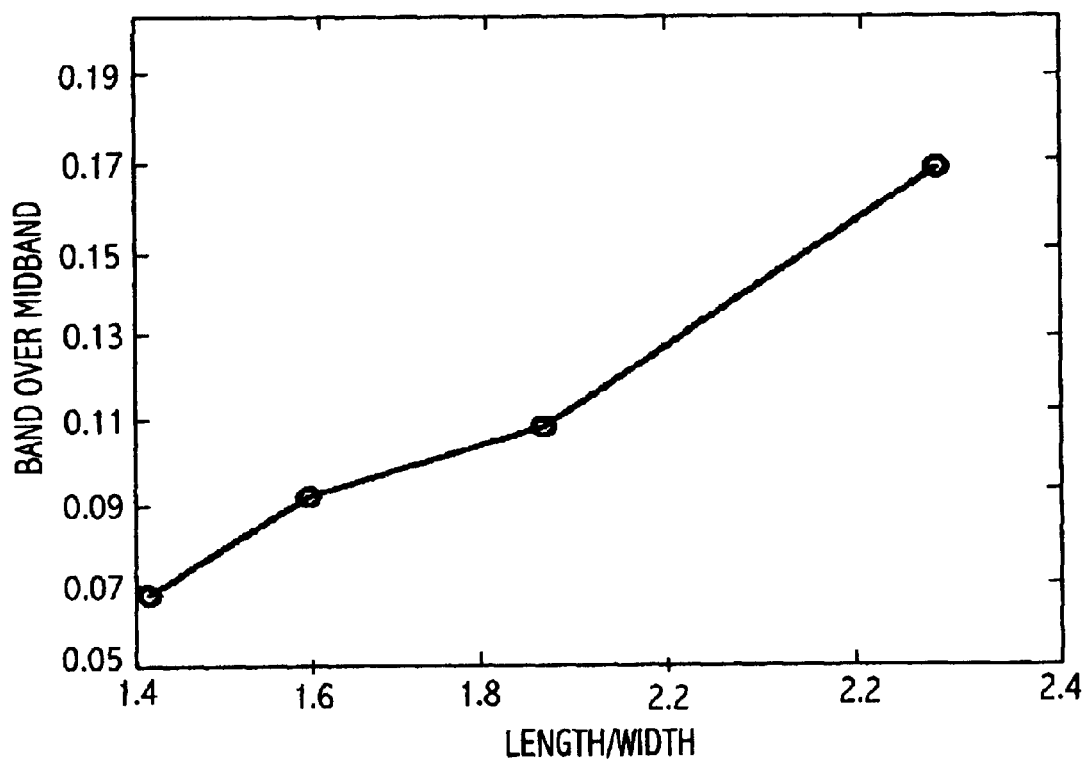
FIG. 8c shows a band over midband versus length to width ratio for an embodiment in accordance with the invention.

FIG. 8c shows the width of the waveguide band over mid-frequency versus the ratio of the length to the width for rectangle 720 and a rectangle halfwidth of about 0.29a.

Figure 9A:
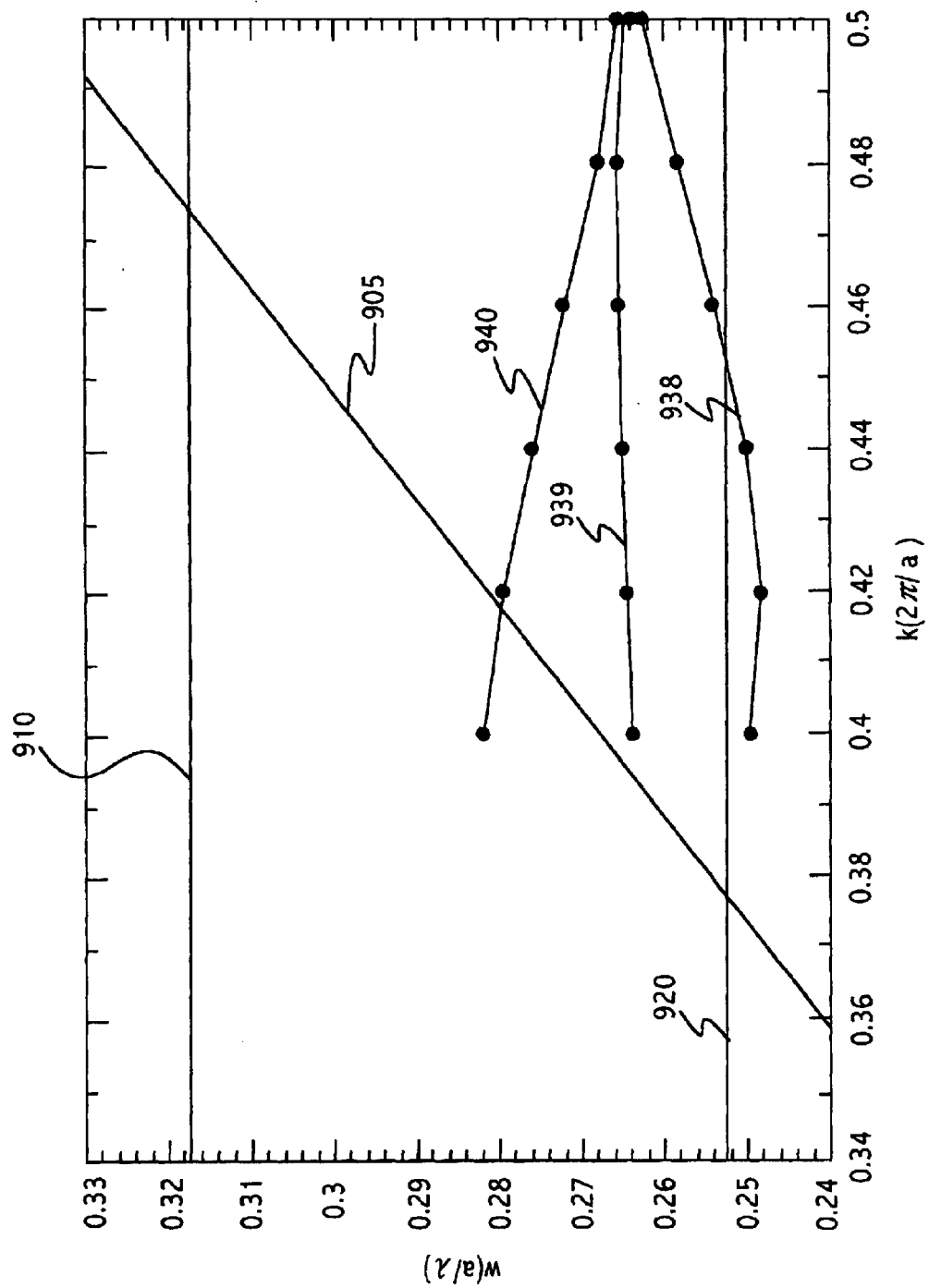
FIG. 9a shows the band structure for a two-dimensional photonic crystal slab apparatus in accordance with the invention.

FIG. 9a shows the band structure for photonic crystal slab apparatus 300 shown in FIG. 3. Solid lines 910 and 920 denote the band edges while line 905 marks the boundary of the lightcone. For the elliptical line defect in FIG. 3 there are three even modes 938, 939 and 940. Even mode 939 has low group velocities, however even modes 940 and 939 have higher group velocities.

Figure 9B:
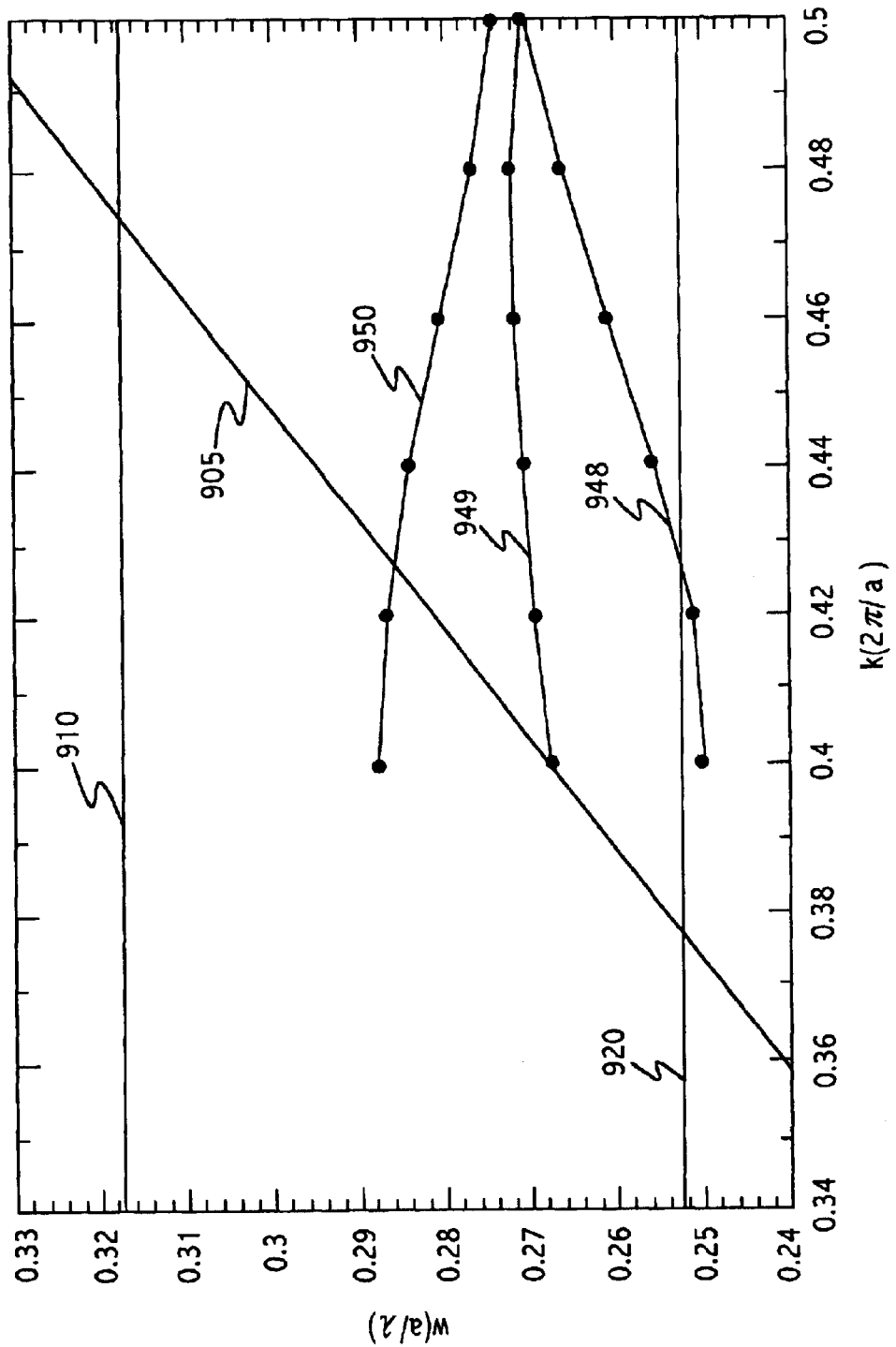
FIG. 9b shows the band structure for a two-dimensional photonic crystal slab apparatus in accordance with the invention.

FIG. 9b shows the band structure for photonic crystal slab apparatus 700 for rectangles 720 in FIG. 7 having a short side of about 0.58a and a long side of about 1.3a. For the rectangle line defect, even modes 948 and 949 have an overlap near the frequency of about 0.27c/a which indicates mode mixing is present which is not desirable in single mode applications. Even mode 950 is comparable to even mode 940 in FIG. 9a.

Figure 9C:
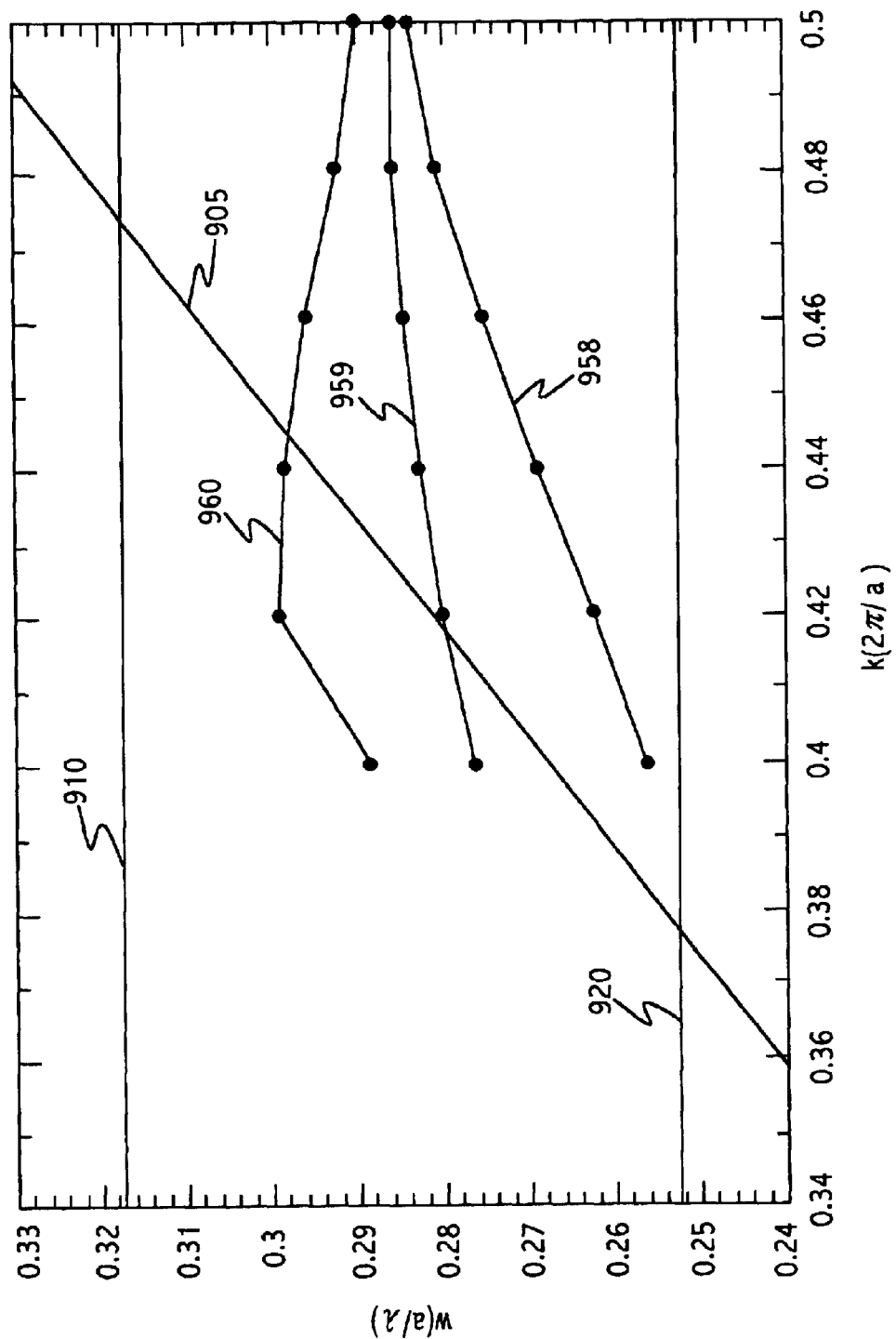
FIG. 9c shows the band structure for a two-dimensional photonic crystal slab apparatus in accordance with the invention.

FIG. 9c shows the band structure for photonic crystal slab apparatus 700 with rectangles 720 in FIG. 7 having a short side of about 0.62a and a long side of about 1.38a. Again three even modes 960, 959 and 958 are present. However, transmission is less effective for the configuration in FIG. 9c.

In accordance with the invention, elliptical holes 320 and rectangular holes 720 provide much wider waveguide bands than do circular holes 120. In all cases, transmission decreases rapidly when there is an overlap between noncircular holes such as elliptical holes 320 or rectangular holes 720. Transmission also decreases rapidly when there is an overlap between noncircular holes and circular holes 310 or 710. However, over 10% guiding bandwidth is achieved for a wide range of elliptical and rectangular shapes. Rectangle-like holes with rounded shapes close to neighboring holes also results in wide waveguide bands.

Figure 10A:
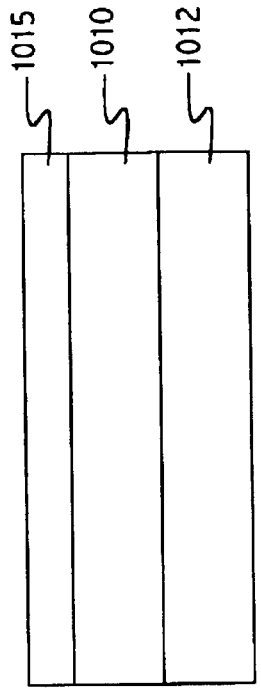
FIG. 10a show a side view of the initial structure for making an embodiment in accordance with the invention using a silicon on insulator wafer.
Figure 10B:
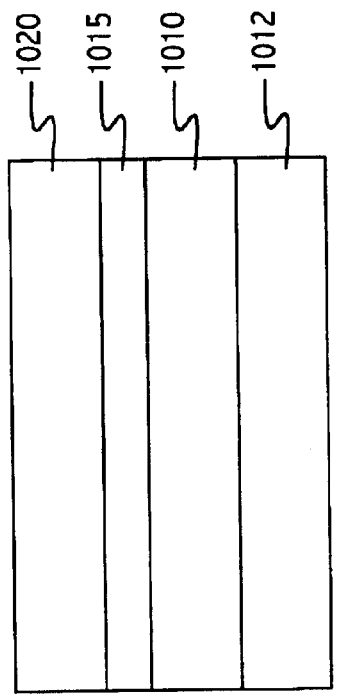
Figure 10C:
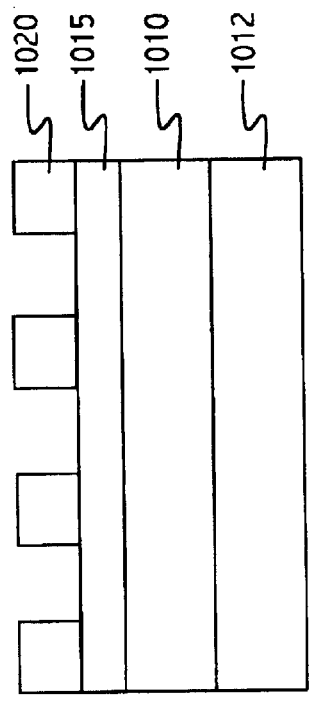
FIG. 10c shows the structure after patterning of the e-beam resist layer.
Figure 10D:
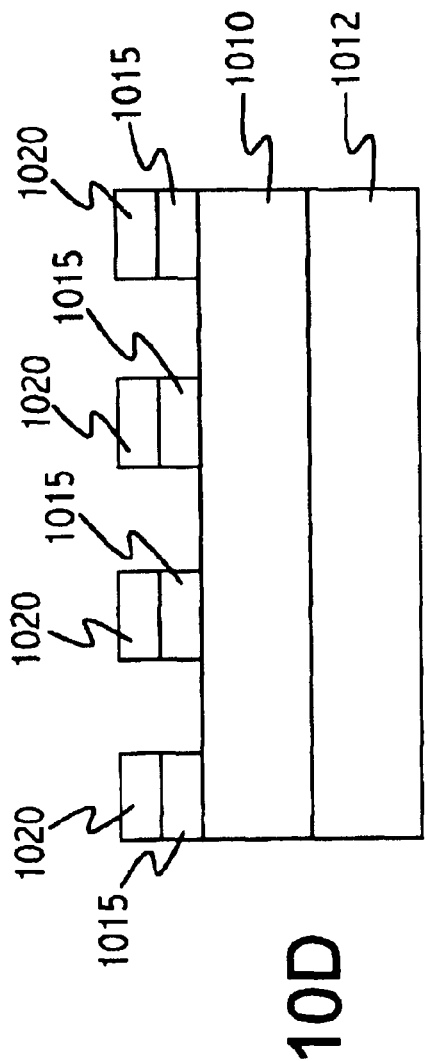
FIG. 10d shows the structure after etching of the $SiO_2$ layer to form a mask for subsequent etching of the silicon layer.
Figure 10E:
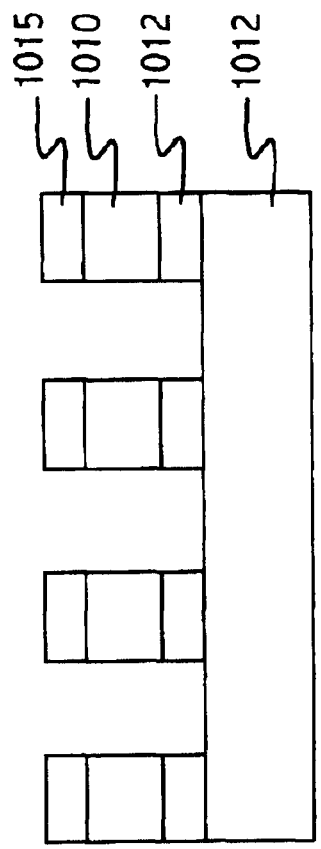
FIG. 10e shows the completed structure after etching in accordance with the invention.

Photonic crystal slab apparatus 300 or photonic crystal slab apparatus 700 may be fabricated in accordance with an embodiment of the invention as shown in FIGS. 10a–10e. The initial structure is a silicon on insulator (SOI) structure having silicon layer 1010 and $SiO_2$ layer 1012. A photonic crystal structure is fabricated in Si layer 1010. Typically, thin $SiO_2$ layer 1015 is deposited over Si layer 1010 to serve as a mask layer for subsequent etching of Si layer 1010 as shown in FIG. 10a. E-beam resist layer 1020 is typically deposited over thin $SiO_2$ layer 1015 to a typical thickness of about 400 nm as shown in FIG. 10b. Resist layer 1020 is patterned to the desired lattice hole pattern using e-beam lithography as shown in FIG. 10c. Then, thin $SiO_2$ layer 1015 is etched using reactive ion etching to obtain the desired lattice hole pattern as shown in FIG. 10d. Following creation of the desired mask pattern, the lattice pattern etched in $SiO_2$ layer 1015 is transferred to Si layer 1010 by a controlled etch typically using HBr shown in 10e. Note that Si layer 1010 is overetched resulting in penetration into $SiO_2$ layer 1020. The completed two-dimensional photonic crystal slab apparatus after the controlled etch is shown in FIG. 10e in a side view.

Figure 11A:
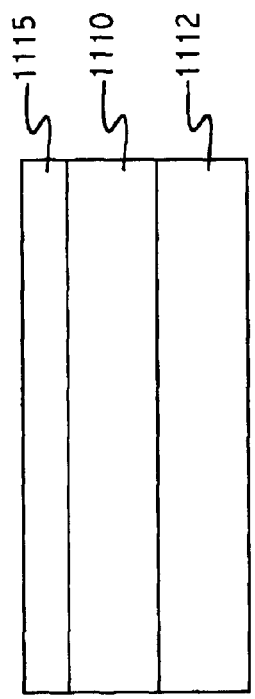
FIG. 11a shows a side view of the initial structure for making an embodiment in accordance with the invention using a GaAs substrate.
Figure 11B:
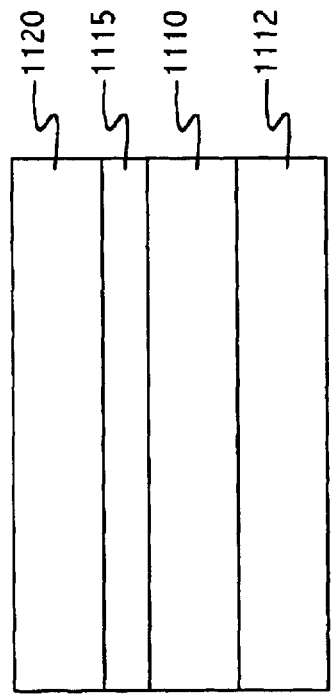
Figure 11C:
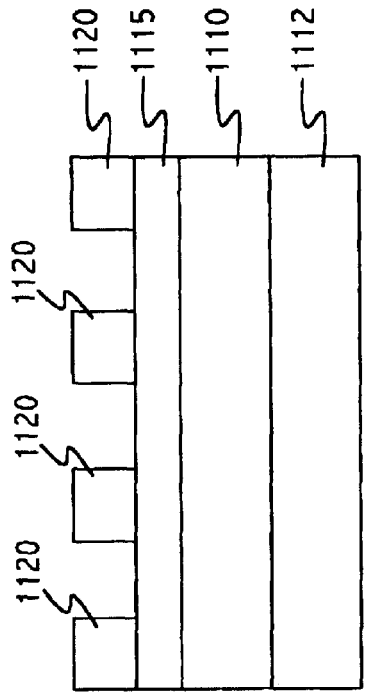
FIG. 11c shows the structure after patterning of the e-beam resist layer.
Figure 11D:
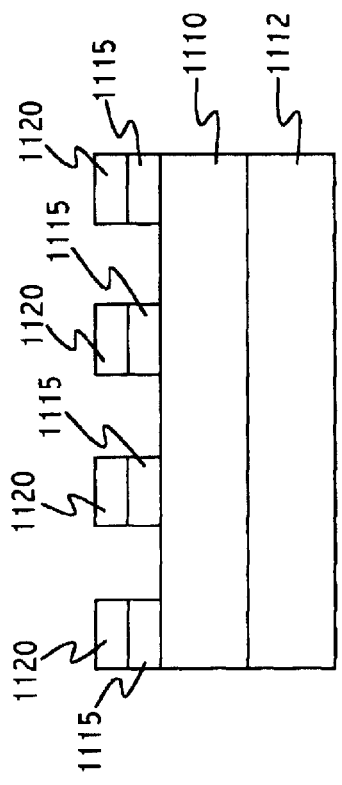
FIG. 11d shows the structure after etching of the $SiO_2$ layer to form a mask for subsequent etching of the GaAs layer.
Figure 11E:
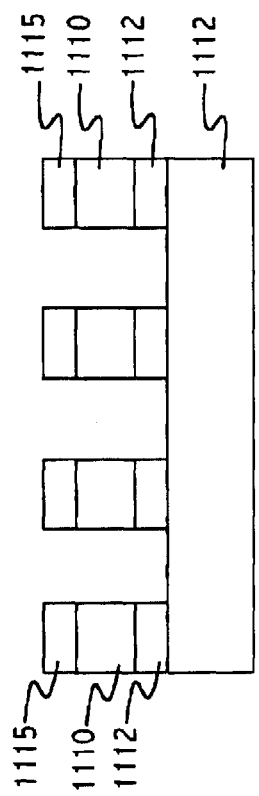
FIG. 11e shows the structure after etching of the GaAs layer.
Figure 11F:
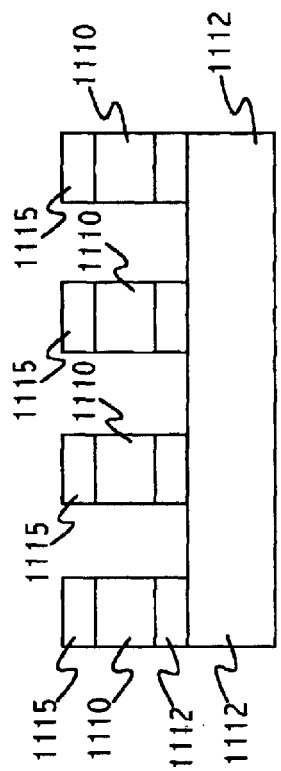
FIG. 11f shows the completed structure after oxidation of the aluminum containing layer.

Photonic crystal slab apparatus 300 or photonic crystal slab apparatus 700 may be fabricated in accordance with an embodiment of the invention as shown in FIGS. 11a–11f. Typically, thin $SiO_2$ layer 1115 is deposited over GaAs layer 1110 to a typical thickness of about 200 nm to serve as a mask layer for subsequent etching of GaAs layer 1110 as shown in FIG. 11a. GaAs layer 1110 is attached to AlGaAs layer 1112. E-beam resist layer 1120 is deposited over thin $SiO_2$ layer 1115 to a typical thickness of about 400 nm as shown in FIG. 11b. Resist layer 1120 is patterned to the desired lattice hole pattern using e-beam lithography as shown in FIG. 10c. Then, thin $SiO_2$ layer 1115 is etched using reactive ion etching with $CHF_3$ to obtain the desired lattice hole pattern as shown in FIG. 11d. Following creation of the desired mask pattern, the lattice pattern etched in $SiO_2$ layer 1115 is transferred to GaAs layer 1110 by a reactive ion etch typically using $Cl_2$ as shown in FIG. 11e. A steam oxidation process is then performed of AlGaAs layer 1112 to convert layer 1112 to $AlO_2$ to obtain the proper refractive index ~1.5.

Figure 12:
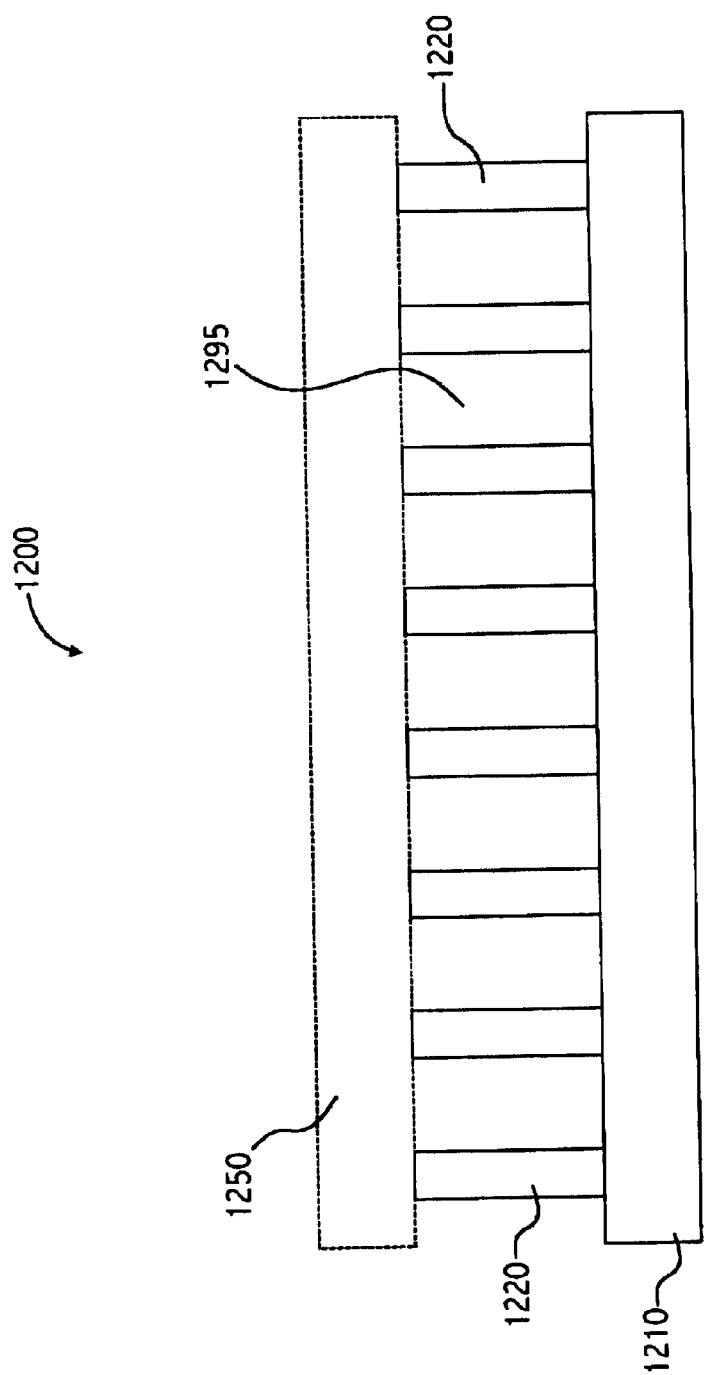
FIG. 12 shows an xz plane cross section of a photonic crystal slab apparatus in accordance with the invention.

FIG. 12 shows an xz plane cross section of photonic crystal structure 1200 used for forming waveguide bends and splitters. Layer 1210 is typically silicon dioxide but may be air and core layer 1220 is typically silicon with a dielectric constant of 12.96. Details for implementing layer 1210 as an air layer are disclosed in "Waveguiding in planar photonic crystals", Loncar et al., Applied Physics Letters, 77, 1937, 2000 which is incorporated by reference. If layer 1210 is silicon dioxide, part of layer 1210 near corner of the waveguide bend or splitter may be etched away to improve performance. Also, circular holes 1295 may be etched to extend into silicon dioxide layer 1210 to lower the effective dielectric constant of layer 1210 to reduce leakage into layer 1210. Top layer 1250 is typically air but may also be silicon dioxide. In the exemplary embodiments in accordance with the invention discussed below, top layer 1250 is taken to be air.

Photonic crystal structure 1200 has triangular lattice symmetry with lattice constant a and circular hole radius of about 0.29a. Circular holes 1295 may pendrate through core layer 1220 and not into layer 1210. Core layer 1220 has a typical thickness of about 0.6a. The waveguide is created by introducing defects into the photonic crystal structure such as the elliptical holes discussed above.

Figure 13:
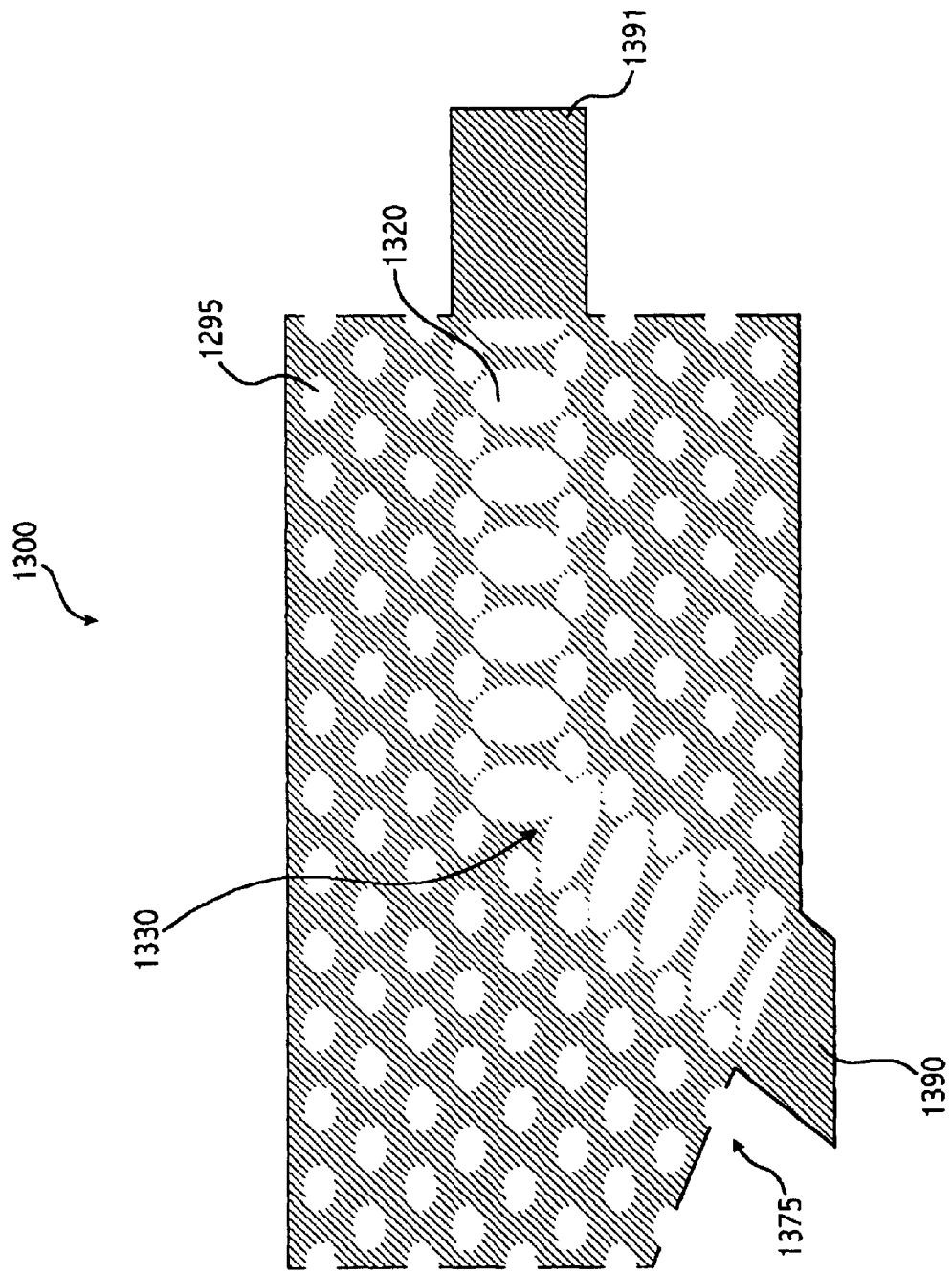
FIG. 13 shows an xy plane cross section with waveguide bend of a photonic crystal slab apparatus in accordance with the invention.

FIG. 13 shows an xy plane cross section of photonic crystal lattice 1300 with waveguide bend 1330. The waveguide path is defined by the introduction of ellipses 1320 as photonic crystal lattice defects. The ratio of the major axis to the minor axis of ellipses 1320 is fixed at approximately 2.236. Note that waveguide bend 1330 is typically limited in angle to the symmetry planes of photonic crystal lattice 1300. Hence, the angle of the bend is typically either about 120 or 60 degrees to either side. FIG. 13 shows a bend of about 60 degrees. Photonic crystal lattice 1300 is cut so that conventional waveguide 1390 is perpendicular to photonic crystal face 1375.

Figure 14A:
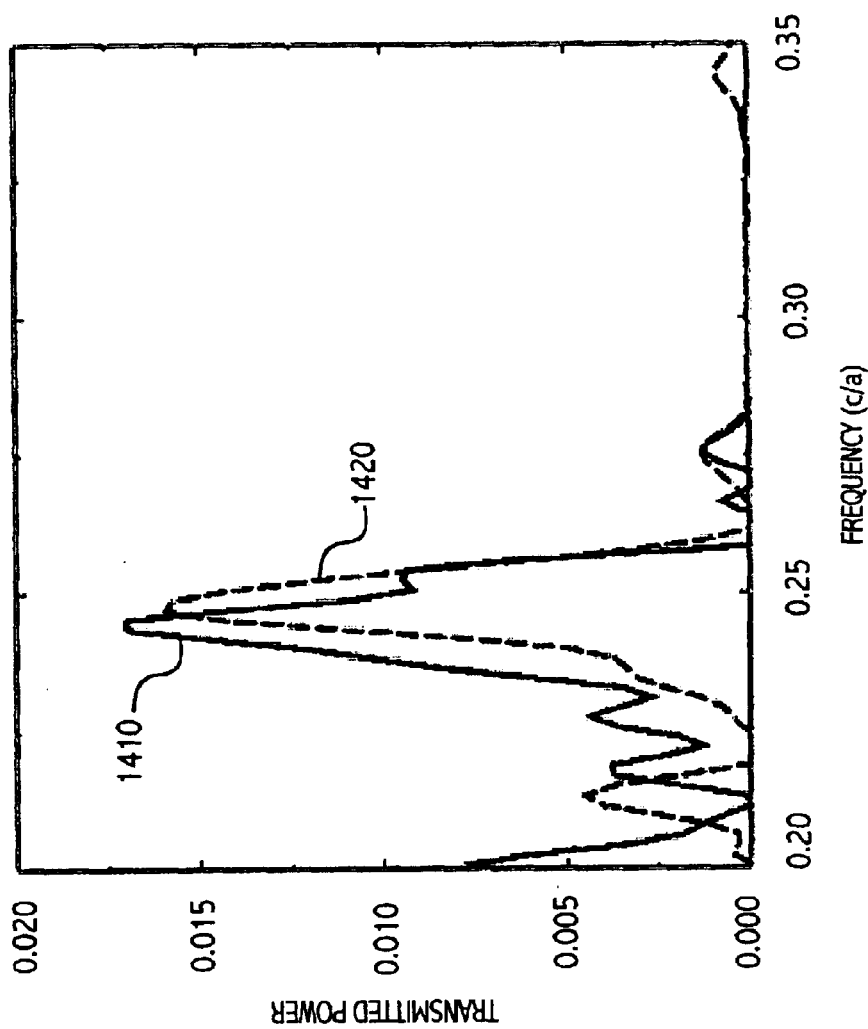
FIG. 14a shows a transmission versus frequency graph for a two-dimensional photonic crystal slab apparatus in accordance with the invention.
Figure 14B:
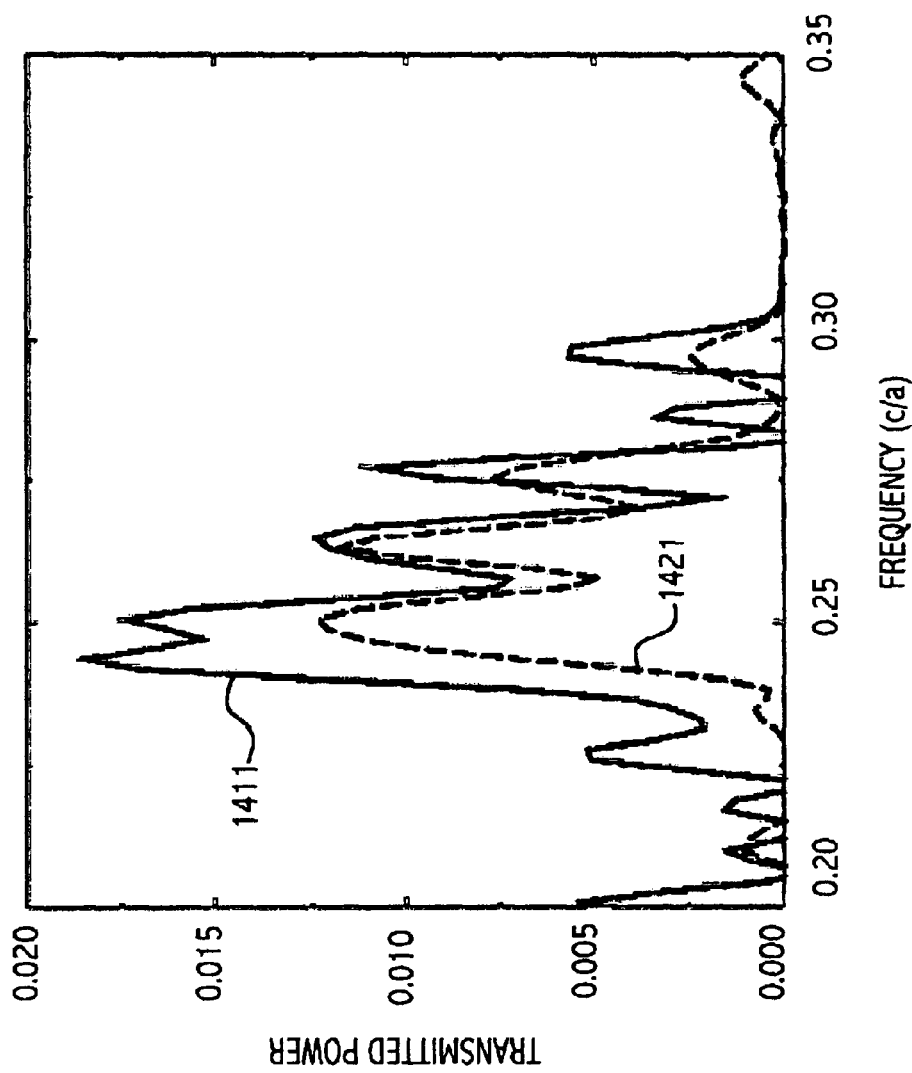
FIG. 14b shows a transmission versus frequency graph for a two-dimensional photonic crystal slab apparatus in accordance with the invention.
Figure 14C:
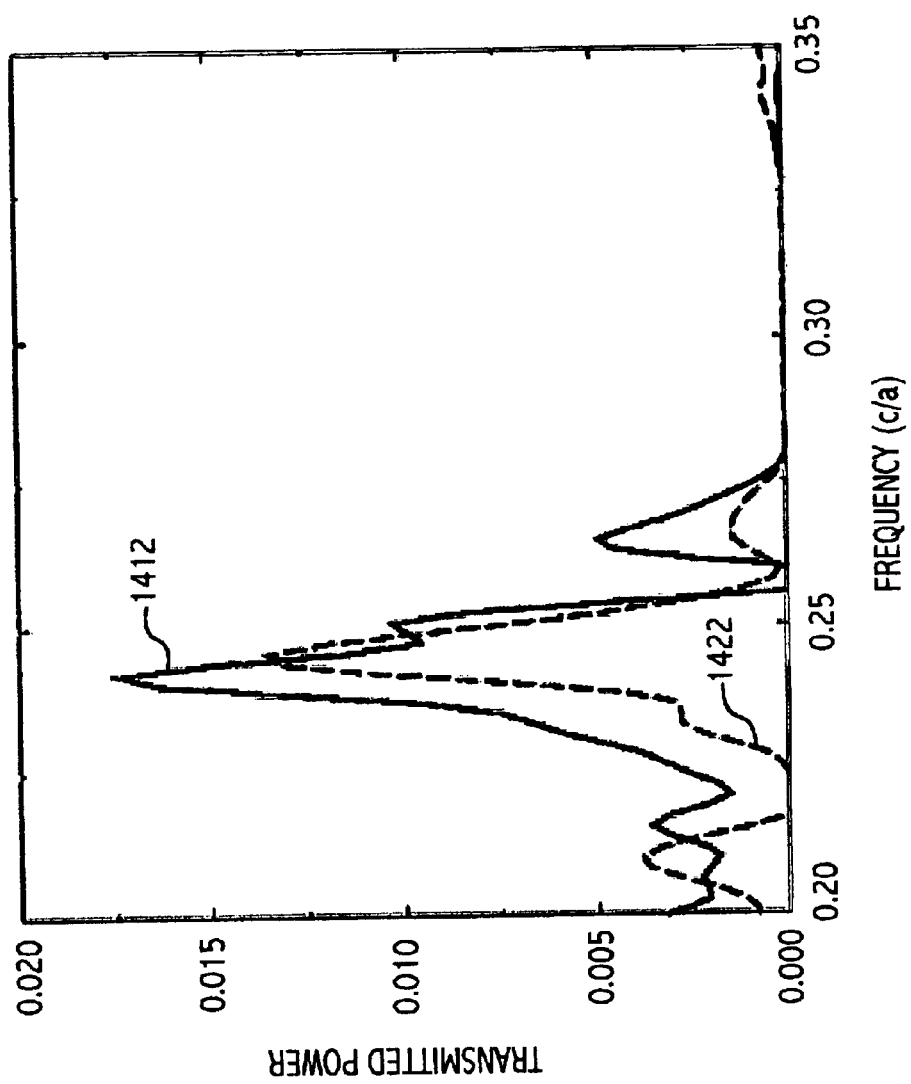
FIG. 14c shows a transmission versus frequency graph for a two-dimensional photonic crystal slab apparatus in accordance with the invention.
Figure 14D:
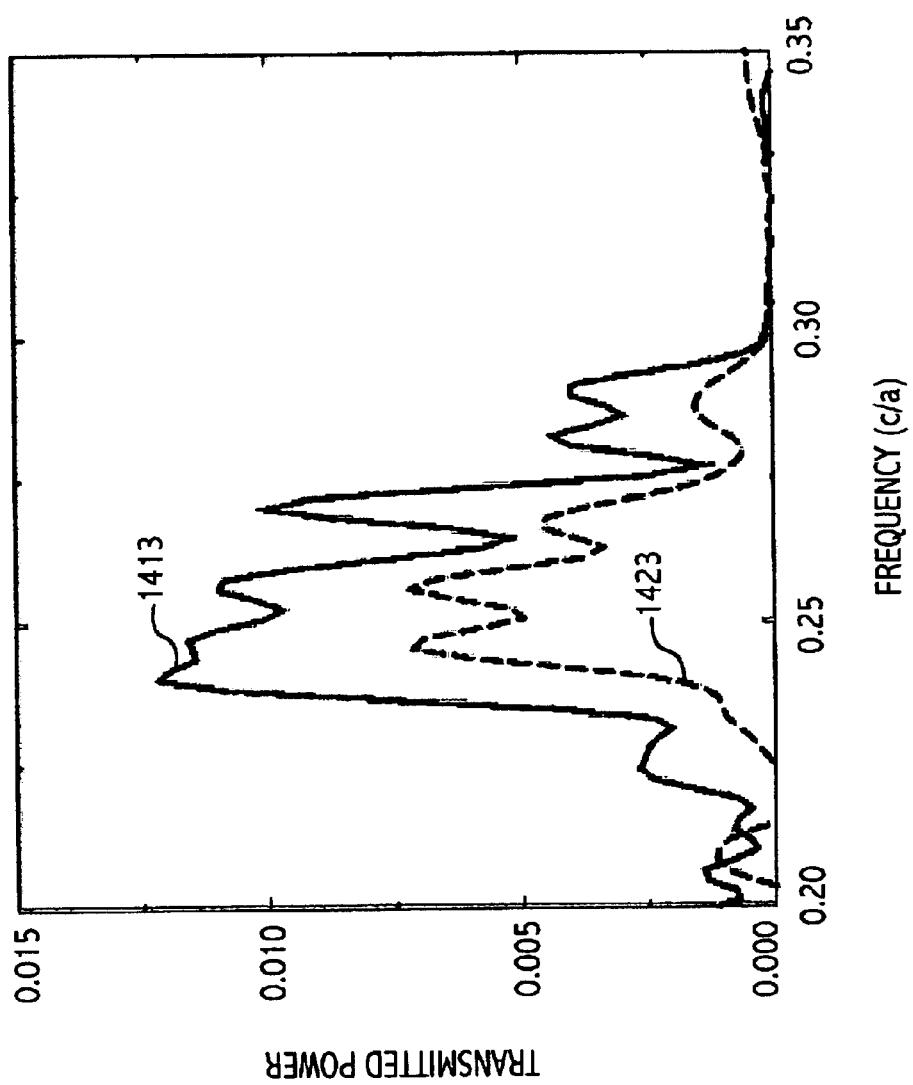
FIG. 14d shows a transmission versus frequency graph for a two-dimensional photonic crystal slab apparatus in accordance with the invention.

FIGS. 14a–d show the transmitted power before and after waveguide bend 1330. In FIGS. 14a–d solid lines 1410, 1411, 1412 and 1413 represent the power before waveguide bend 1330 and dashed lines 1420, 1421, 1422 and 1423 represent the power after waveguide bend 1330, respectively. The transmitted power is compared two unit cells before and after waveguide bend 1330 to reduce the coupling effects between conventional ridge waveguides 1390, 1391 and the photonic crystal waveguide in photonic crystal lattice 1300. Due to reflections from boundaries, standing waves may be formed inside photonic crystals, and photonic crystal lattice 1300 in particular. Creation of the standing waves may create fluctuations in the transmitted power so that the results for transmitted power may become location dependent. FIG. 14a has layer 1210 in FIG. 12 being an air layer and ellipses 1320 have a minor axis equal to about 0.66a. The difference between solid line 1410 and dashed line 1420 indicates there is better than about 70% transmission through waveguide bend 1330 in a narrow frequency range between a/λ≈0.25 to 0.26. FIG. 14b has air for layer 1210 as well with a better than 70% transmission through waveguide bend for a somewhat wider frequency range of a/λ≈0.225 to 0.275 where ellipses 1320 have a minor axis equal to about 0.74 a. FIG. 14c has layer 1210 (see FIG. 12) as a silicon dioxide or other type of oxide layer with a dielectric constant of about 2. For FIG. 14c, ellipses 1320 have a minor axis equal to about 0.66a and the results are similar to FIG. 14a. FIG. 14d also has layer 1210 (see FIG. 12) as a silicon dioxide or other type of oxide layer with a dielectric constant of about 2. For FIG. 14d, ellipses 1320 have a minor axis equal to about 0.74a. Transmission is degraded from the case shown in FIG. 14b.

Figure 15:
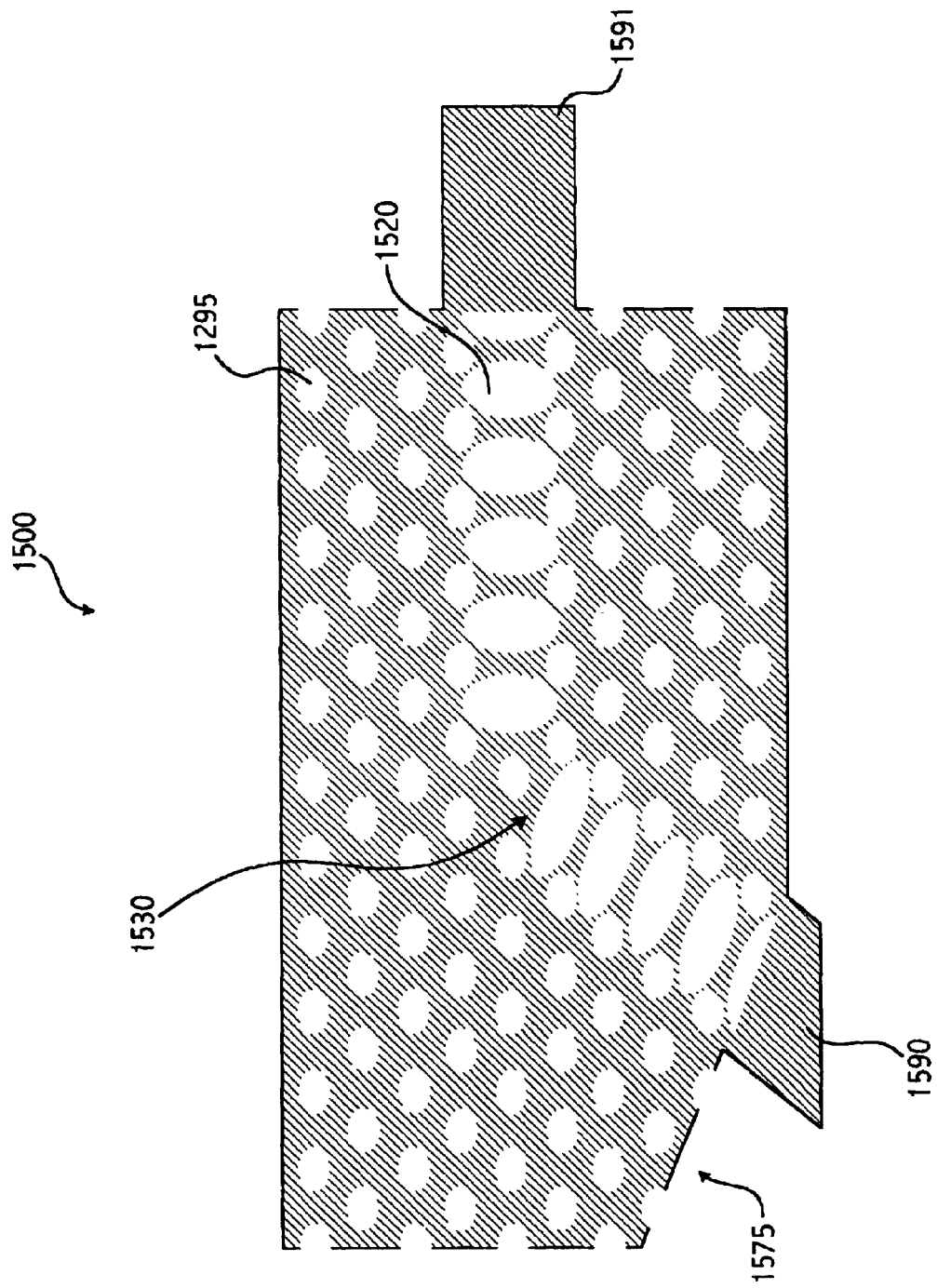
FIG. 15 shows an xy plane cross section with waveguide bend of a photonic crystal slab apparatus in accordance with the invention.

The embodiment in accordance with the invention shown in FIG. 13 is difficult to fabricate in the vicinity of waveguide bend 1330 because of the overlap of ellipses 1320 and using air for layer 1210 also introduces fabrication difficulties. FIG. 15 shows photonic crystal lattice 1500 in accordance with the invention where no lattice defect is introduced at waveguide bend 1530. FIG. 15 shows a waveguide bend of about 60 degrees. Photonic crystal lattice 1500 is cut so that conventional waveguide 1590 is perpendicular to photonic crystal face 1575.

Figure 16A:
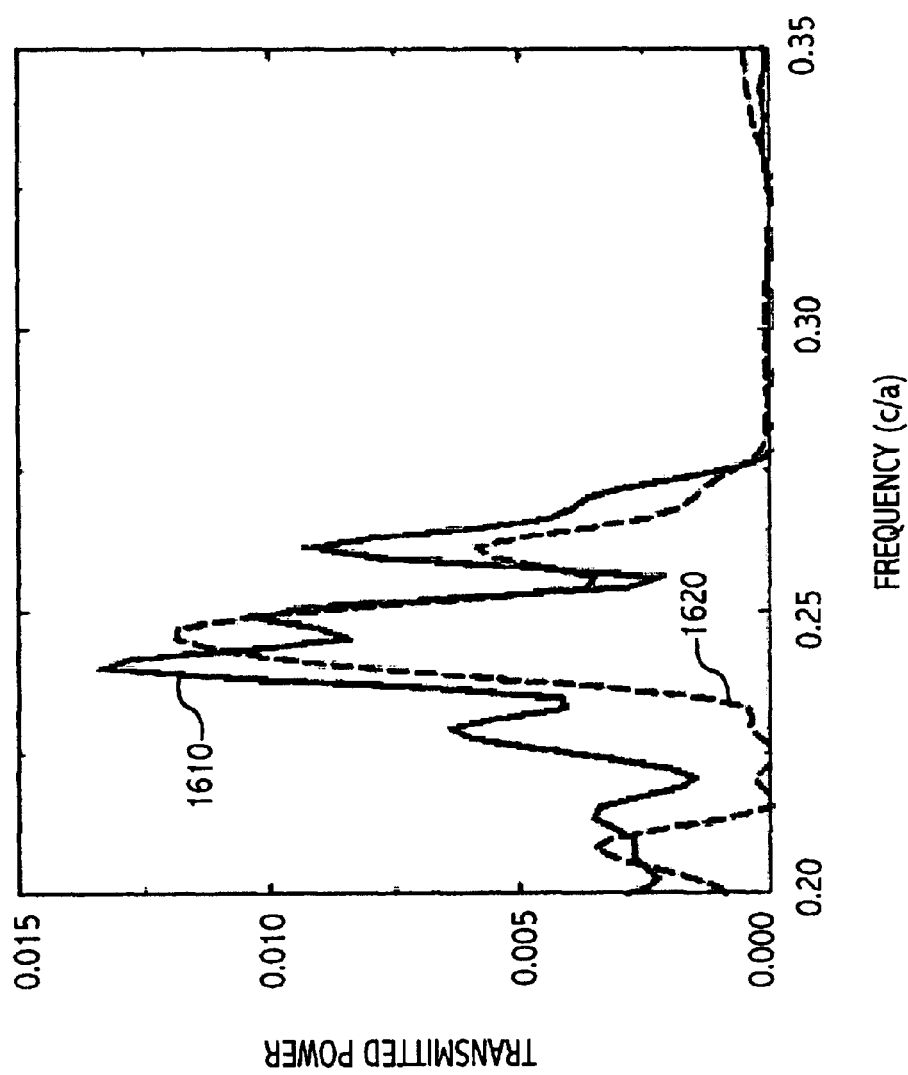
FIG. 16a shows a transmission versus frequency graph for a two-dimensional photonic crystal slab apparatus in accordance with the invention.
Figure 16B:
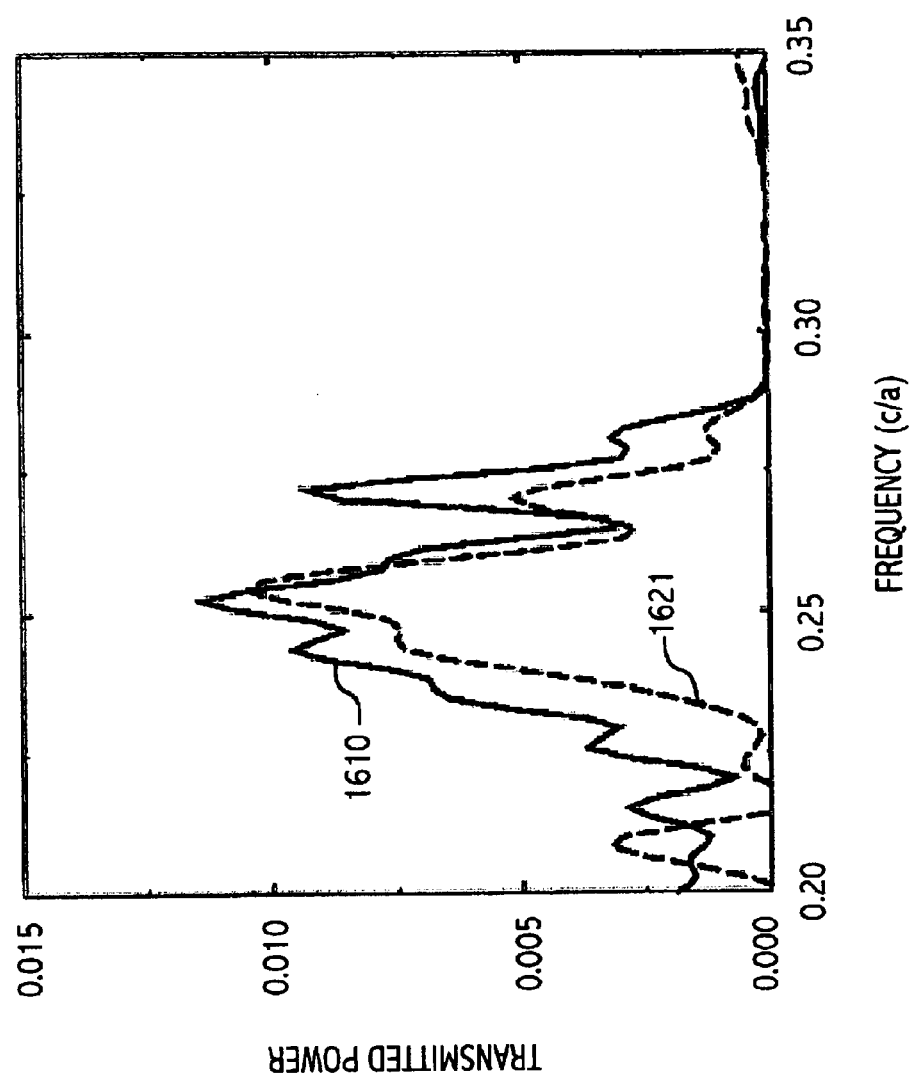
FIG. 16b shows a transmission versus frequency graph for a two-dimensional photonic crystal slab apparatus in accordance with the invention.
Figure 16C:
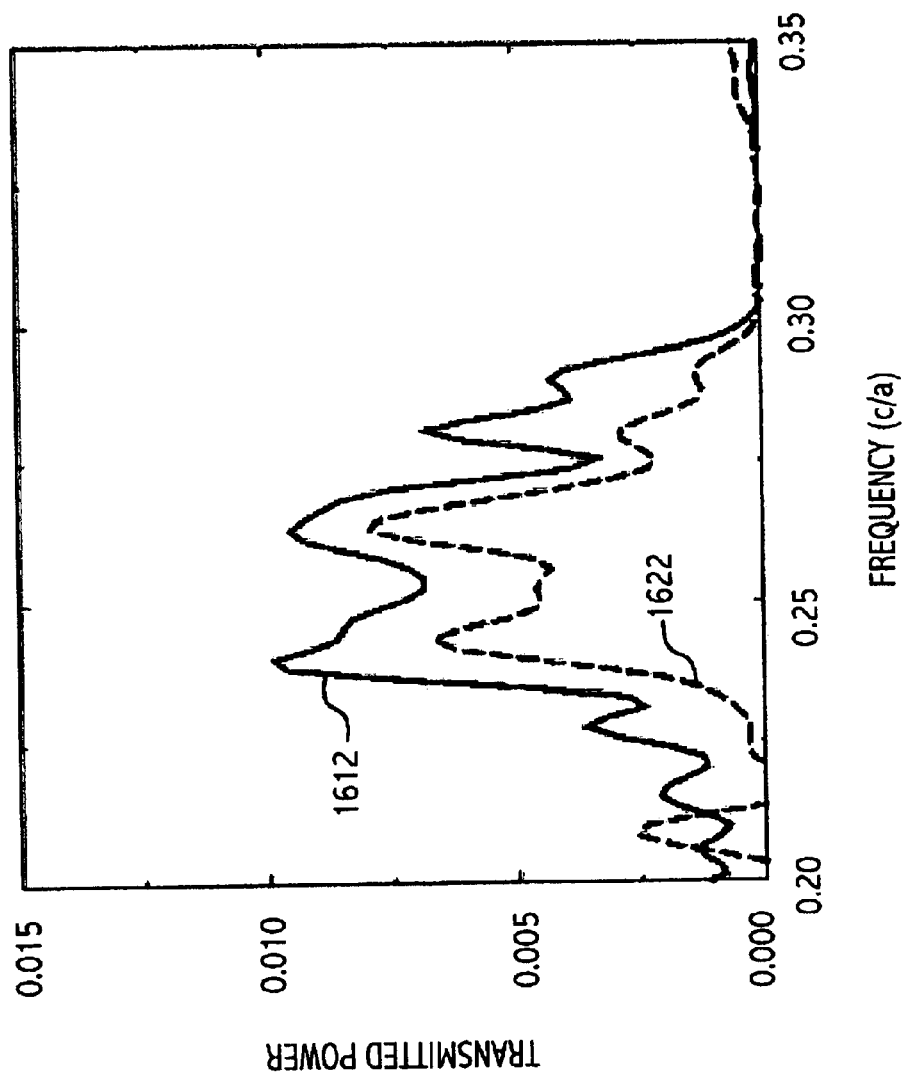
FIG. 16c shows a transmission versus frequency graph for a two-dimensional photonic crystal slab apparatus in accordance with the invention.
Figure 16D:
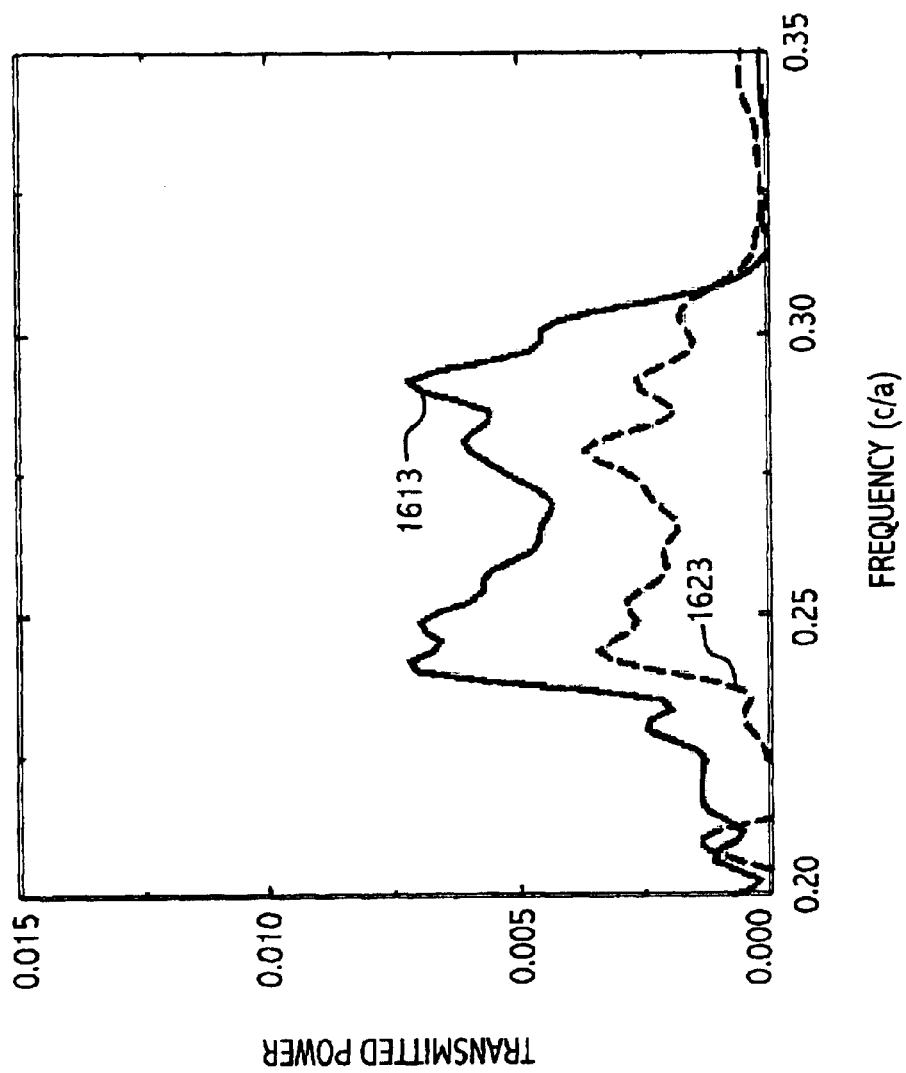
FIG. 16d shows a transmission versus frequency graph for a two-dimensional photonic crystal slab apparatus in accordance with the invention.

FIGS. 16a–d show the transmitted power for photonic crystal lattice 1500 with a silicon dioxide or other oxide layer 1210. In FIGS. 16a–d, solid lines 1610, 1611, 1612 and 1613 represent the power before waveguide bend 1530 and dashed lines 1620, 1621, 1622 and 1623 represent the power after waveguide bend 1530, respectively. FIG. 16a shows the transmitted power as a function of frequency a/λ for ellipses 1520 having a minor axis of about 0.66a. FIG. 16b shows the transmitted power as a function of frequency a/λ for ellipses 1520 having a minor axis of about 0.7a. FIG. 16c shows the transmitted power as a function of frequency a/λ for ellipses 1520 having a minor axis of about 0.74a. FIG. 16d shows the transmitted power as a function of frequency a/λ for ellipses 1520 having a minor axis of about 0.78a. As the minor axis of ellipse 1520 is increased the width of the guided band increases but power transmission through waveguide bend 1530 decreases. For the embodiment of FIG. 16d, the average power transmission through waveguide bend 1530 is 40% in comparison to the embodiment of FIG. 16c where the average power transmission through waveguide bend 1530 is 70%.

Figure 17A:
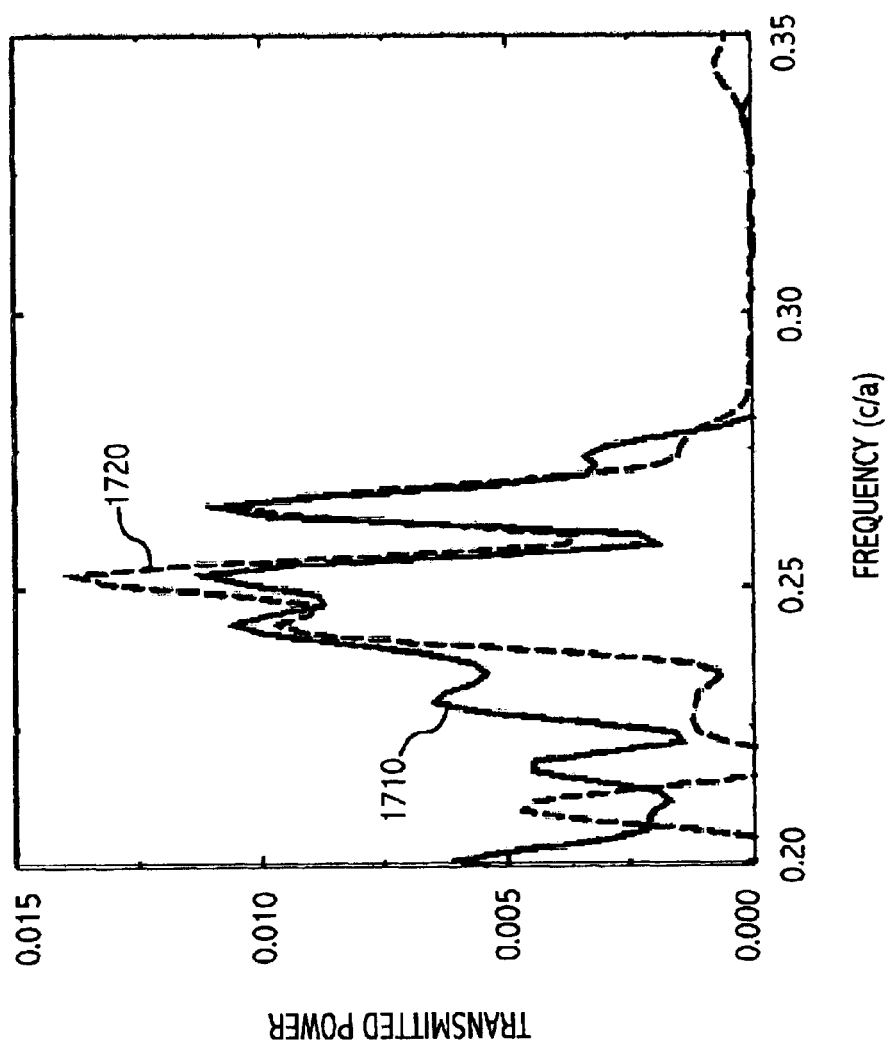
FIG. 17a shows a transmission versus frequency graph for a two-dimensional photonic crystal slab apparatus in accordance with the invention.
Figure 17B:
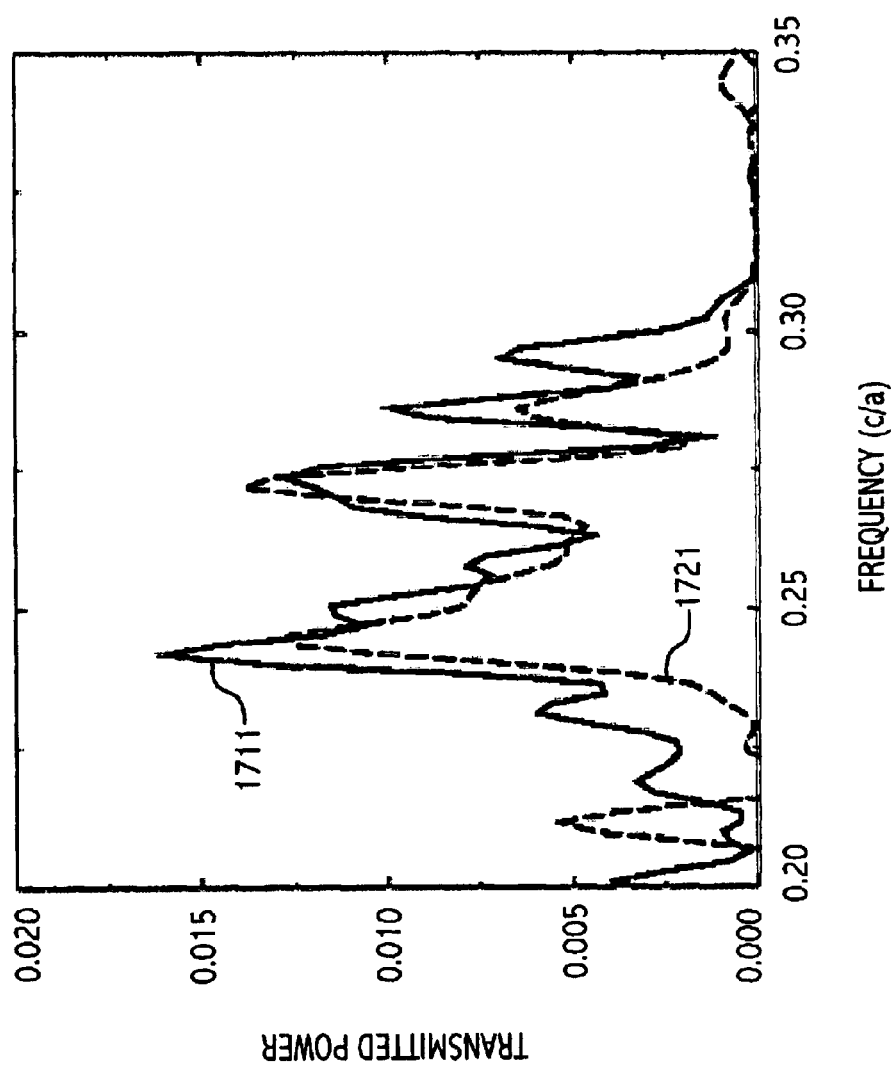
FIG. 17b shows a transmission versus frequency graph for a two-dimensional photonic crystal slab apparatus in accordance with the invention.

Substitution of air (dielectric constant ~1) for silicon dioxide (dielectric constant ~2) in layer 1210 significantly improves power transmission through waveguide bend 1530 as is shown in FIGS. 17a–b. In FIGS. 17a–b, solid lines 1710 and 1711 represent the power before waveguide bend 1530 and dashed lines 1720 and 1721 represent the power after waveguide bend 1530, respectively. FIG. 17a shows dashed line 1720 at a higher amplitude than solid line 1710 which would indicate that power after waveguide bend 1530 is greater at a frequency of about 0.25 than the power before waveguide bend 1530 at that frequency. However, this is actually an artifact of the numerical calculation which may give results that are 10 to 15 percent off depending on the specific location in waveguide the calculations are performed. Physically it is clear that the power after waveguide bend 1530 cannot be greater than the power after waveguide bend 1530. This artifact also occurs in other figures such as FIGS. 17b, 19c, and 22a to a lesser degree.

FIG. 17a shows the transmitted power for ellipse 1520 having a minor axis of about 0.66a while FIG. 17b shows the transmitted power for ellipse 1520 having a minor axis of about 0.74a. In FIG. 17b the power transmission through waveguide bend 1530 is near 90% for a comparatively wide frequency range of a/λ≈0.245–0.285.

Figure 18:
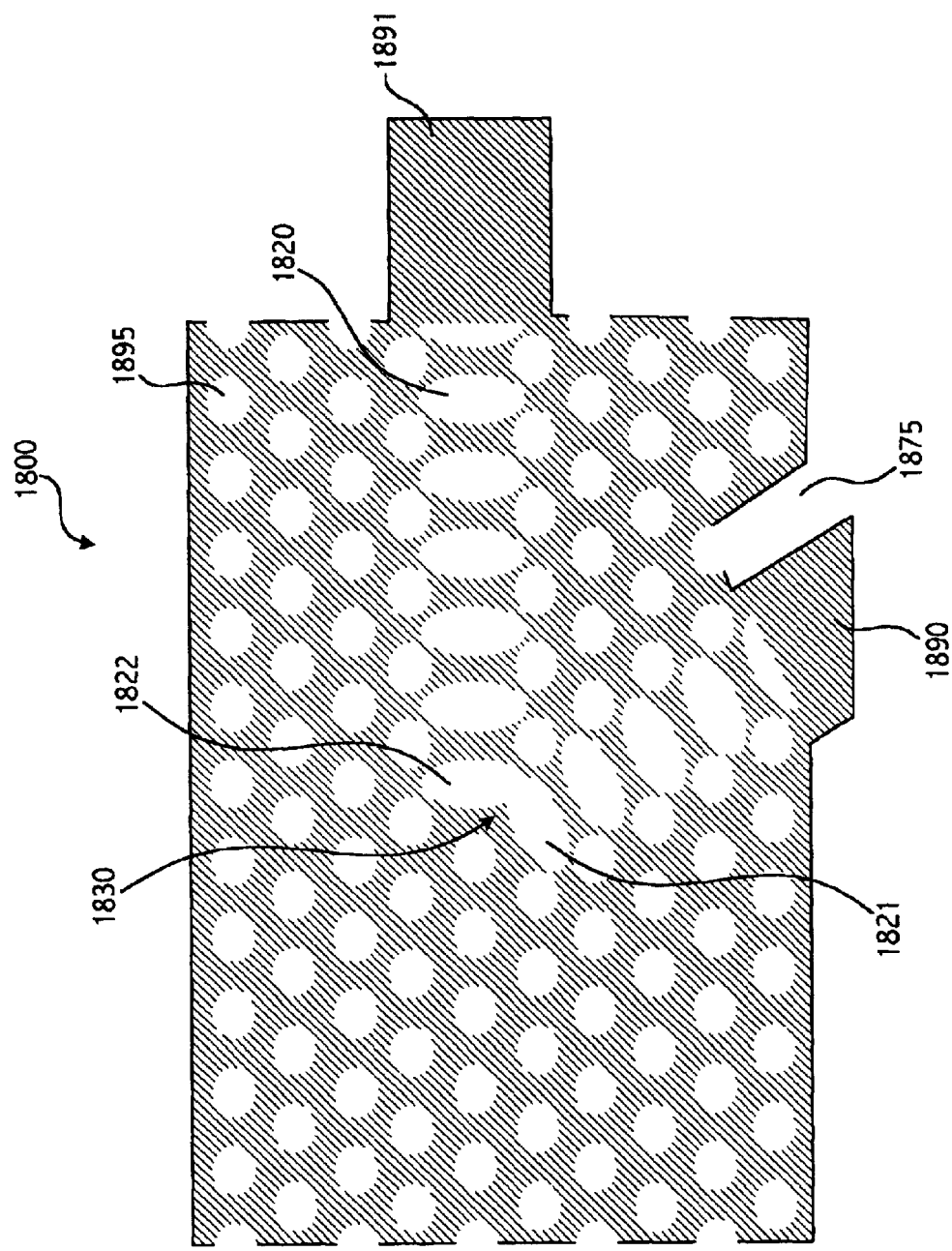
FIG. 18 shows an xy plane cross section with waveguide bend of a photonic crystal slab apparatus in accordance with the invention.

FIG. 18 shows photonic crystal lattice 1800 in accordance with the invention with waveguide bend 1830 of about 120 degrees. Ellipses 1821 and 1822 at waveguide bend 1830 are touching each other. Ellipses 1820, 1821 and 1822 have a minor axis of about 0.66a and a ratio of major to minor axis of about 2.236a. Note cutout 1875 next to conventional waveguide 1890, so that waveguide 1890 is perpendicular to a crystal face. Transmitted power for waveguide bend 1830 differs from waveguide bend 1330 because significantly more power is lost in the directions perpendicular to the propagation direction in the vicinity of waveguide bend 1830 than for waveguide bend 1330.

Figure 19A:
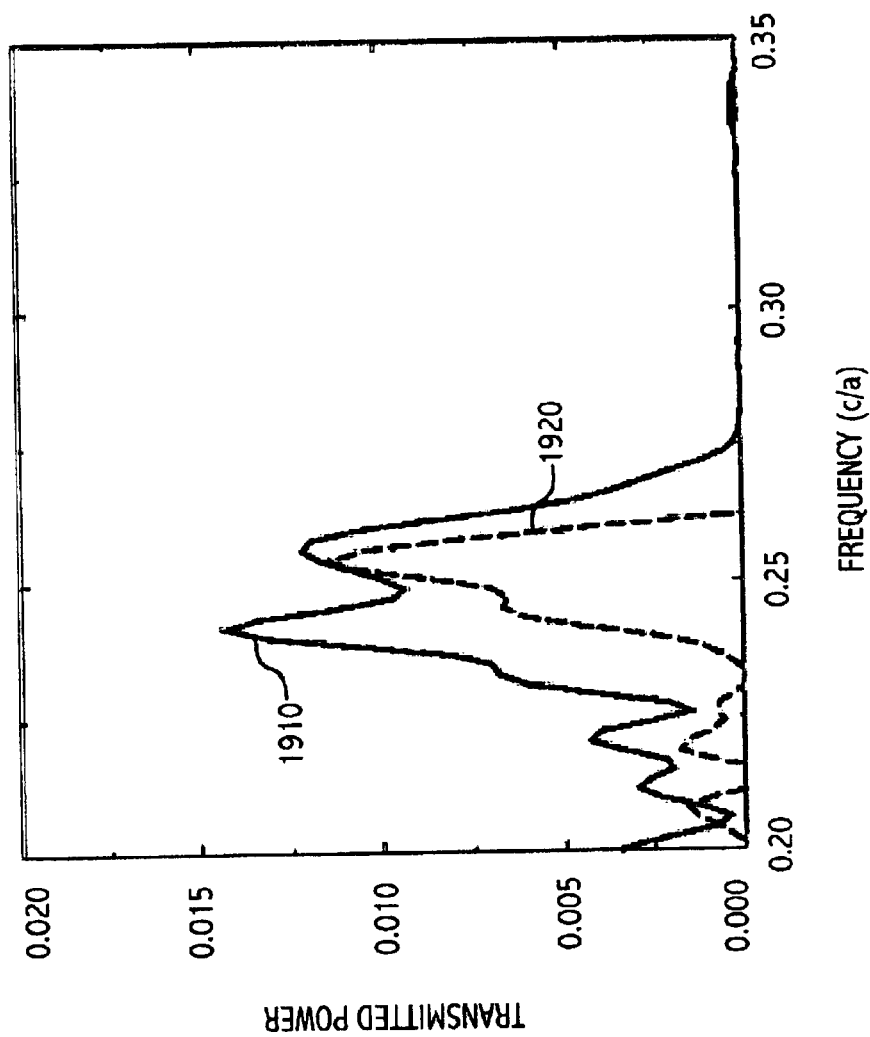
FIG. 19a shows a transmission versus frequency graph for a two-dimensional photonic crystal slab apparatus in accordance with the invention.
Figure 19B:
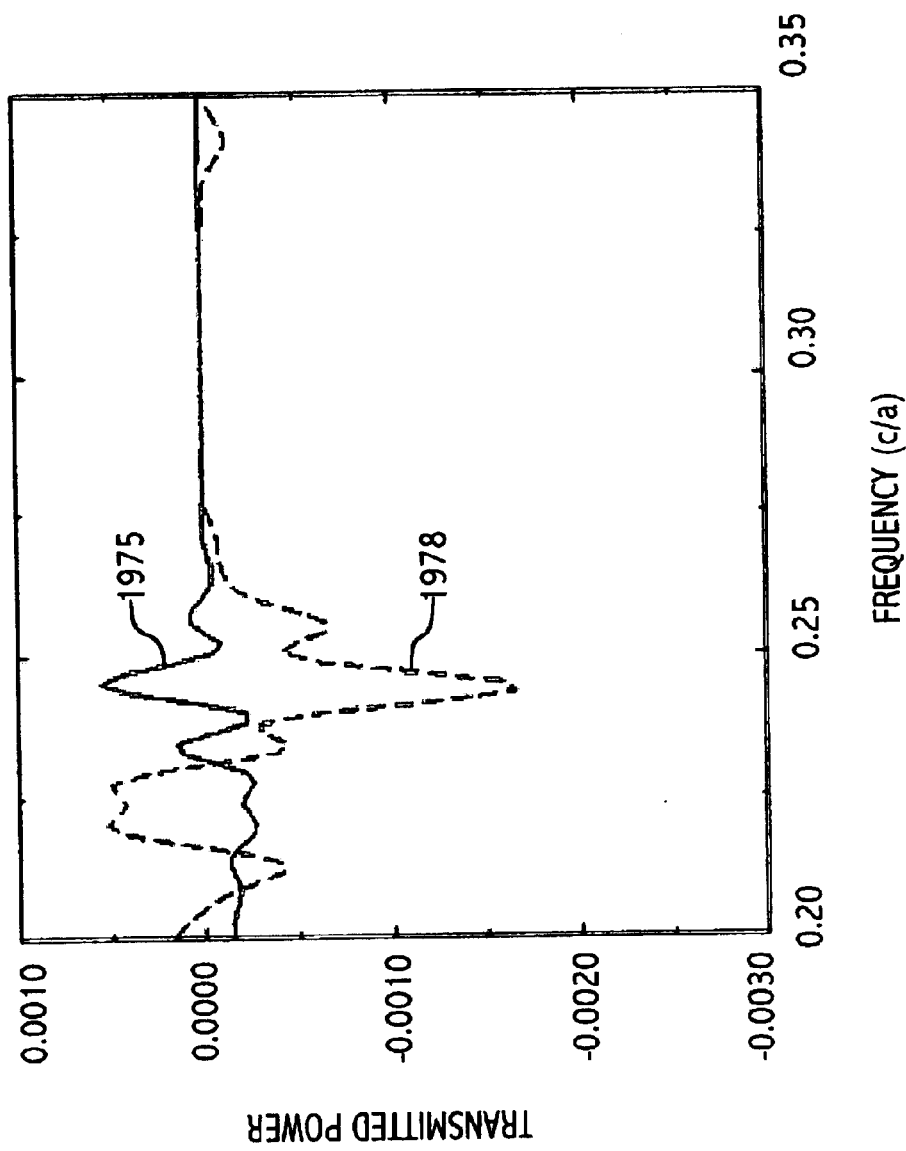
FIG. 19b shows power leakage through the top and bottom of the two-dimensional photonic crystal slab.

FIG. 19a shows the transmitted power before and after waveguide bend 1830 in FIG. 18 with silicon dioxide for layer 1210 (see FIG. 12) as a function of frequency a/λ. Solid line 1910 represents the power before waveguide bend 1830 and dashed line 1920 represents the power after waveguide bend 1830. FIG. 19b shows the power leakage for FIG. 19a in the directions vertical to photonic crystal lattice 1800 where layer 1210 is silicon dioxide and layer 1250 is air. Solid line 1975 shows the power leaking out of the top into layer 1250 as a function of frequency while dashed line 1978 shows the power leaking out the bottom into layer 1210. Note the negative sign for dashed line 1978 is due to the direction of propagation.

FIG. 19c shows the transmitted power before and after waveguide bend 1830 in FIG. 18 with air for layer 1210 as a function of frequency a/λ. Solid line 1911 represents the power before waveguide bend 1830 and dashed line 1921 represents the power after waveguide bend 1830. From FIGS. 19a and 19c it is apparent that having air for layer 1210 improves the transmitted power over the case where layer 1210 is $SiO_2$. Having air for layer 1210 increases the refractive index contrast between layer 1210 and layer 1220 resulting in better confinement in the vertical direction. Increasing the overlap of ellipses 1821 and 1822 by increasing the length of the minor axis while maintaining the ratio of major axis to minor axis reduces confinement in the vertical direction.

Figure 20:
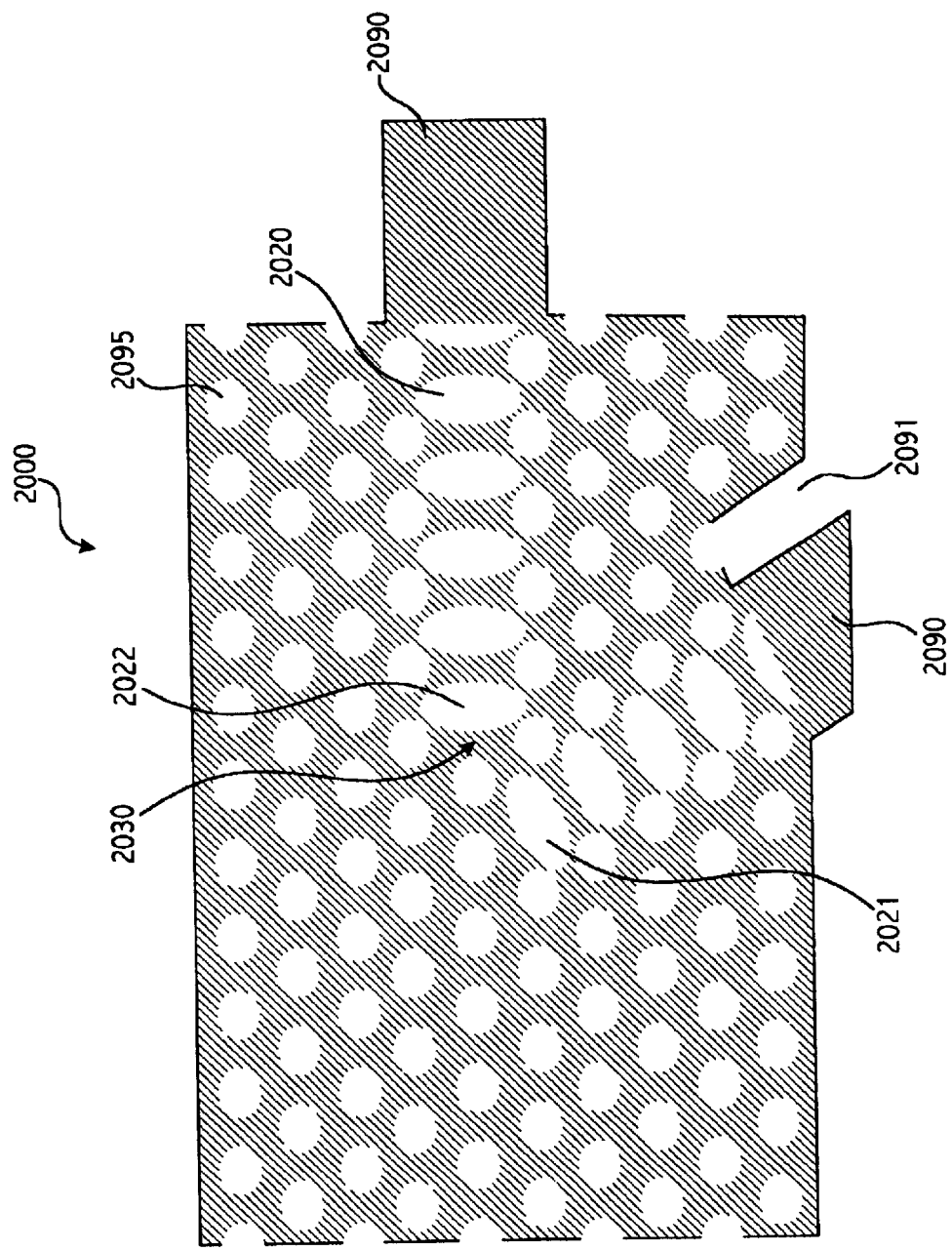
FIG. 20 shows an xy plane cross section with waveguide bend of a photonic crystal slab apparatus in accordance with the invention.

FIG. 20 shows photonic crystal lattice 2000 in accordance with the invention with waveguide bend 2030 of about 120 degrees. Ellipses 2021 and 2022 at waveguide bend 2030 are not in contact with each other. FIG. 20 shows photonic crystal lattice 2000 in accordance with the invention where no lattice defect is introduced at waveguide bend 2030. Note cutout 2091 next to one of conventional waveguides 2090 ensuring that conventional waveguide 2090 is effectively perpendicular to a face of photonic crystal lattice 2000. Transmitted power for waveguide bend 2030 differs from waveguide bend 1530 because significantly more power is lost in the directions perpendicular to the propagation direction in the vicinity of waveguide bend 2030 than for waveguide bend 1530.

Figure 21A:
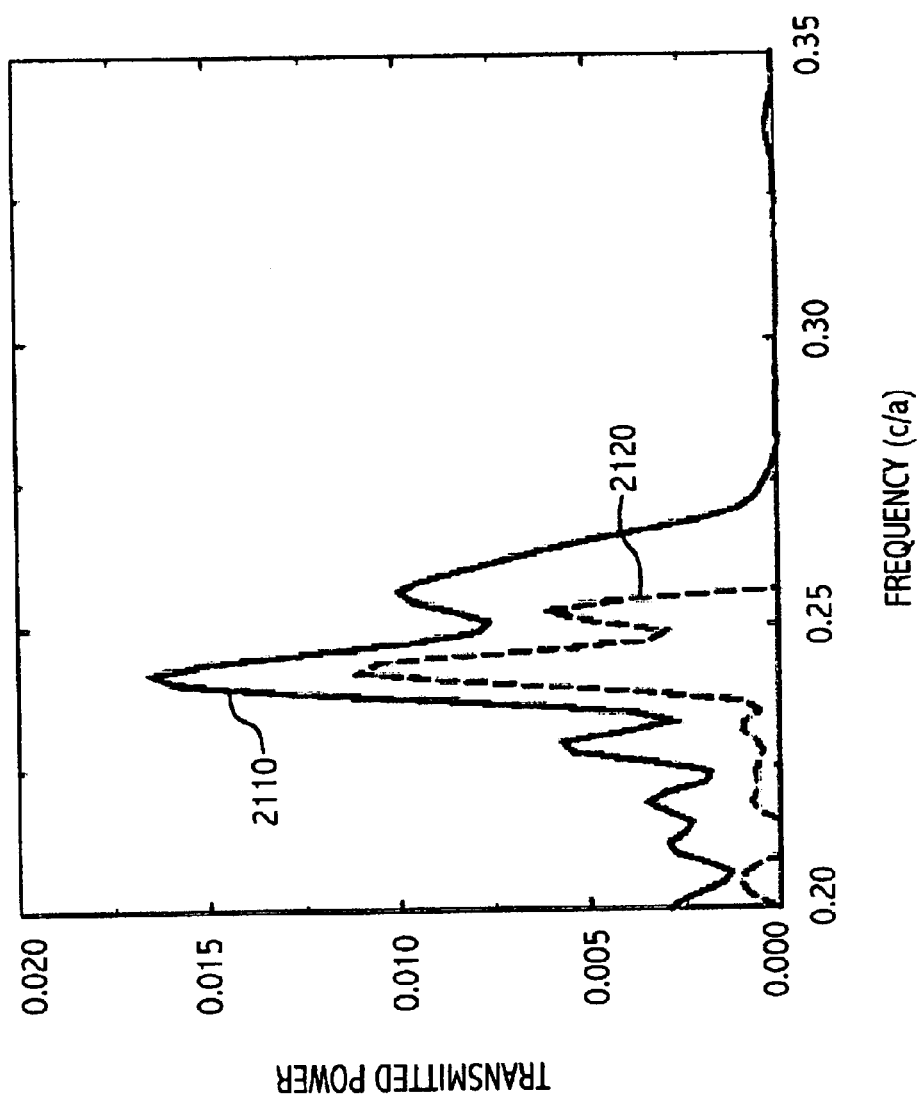
FIG. 21a shows a transmission versus frequency graph for a two-dimensional photonic crystal slab apparatus in accordance with the invention.
Figure 21B:
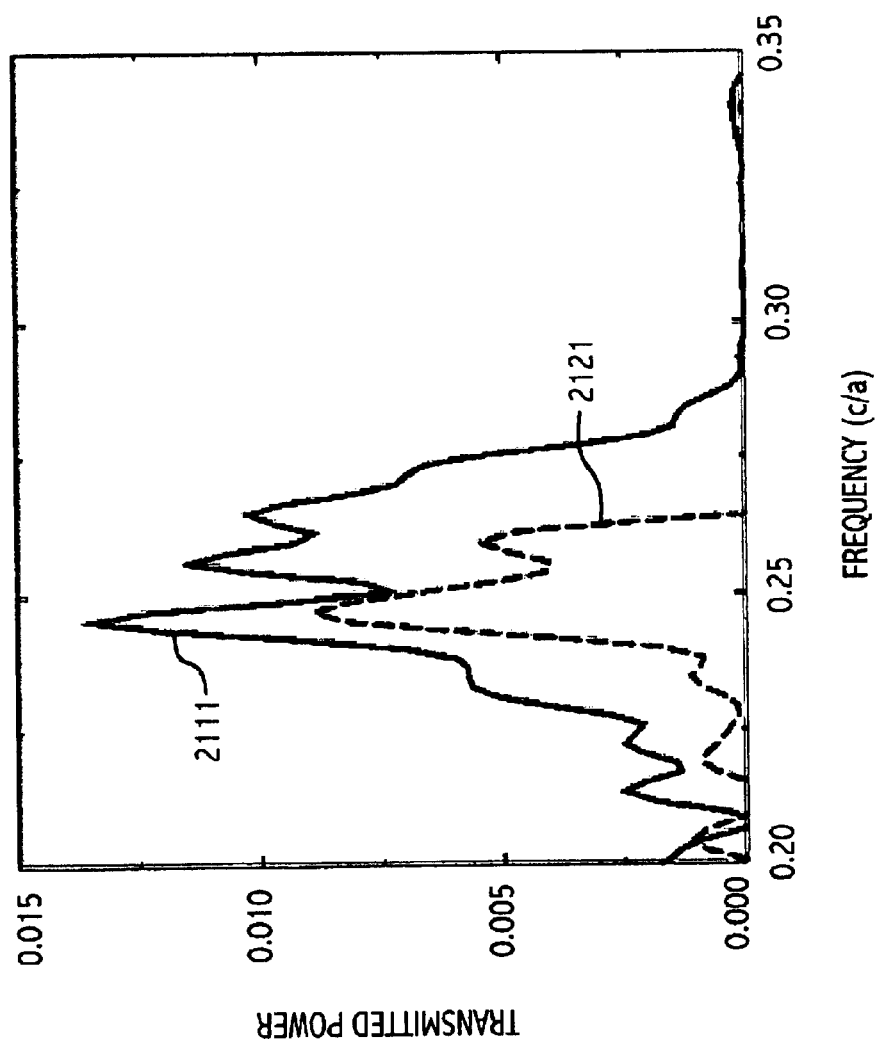
FIG. 21b shows a transmission versus frequency graph for a two-dimensional photonic crystal slab apparatus in accordance with the invention.
Figure 21C:
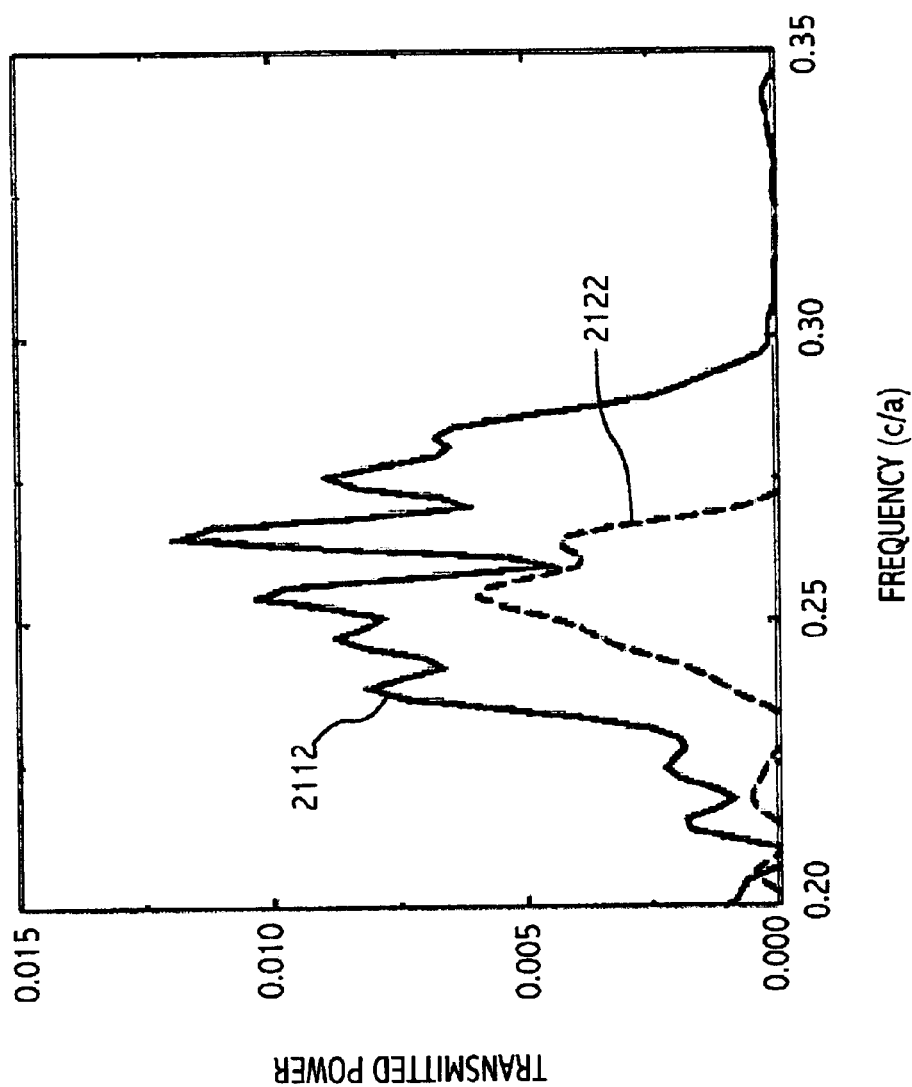
FIG. 21c shows a transmission versus frequency graph for a two-dimensional photonic crystal slab apparatus in accordance with the invention.

FIGS. 21a–c show the transmitted power before and after waveguide bend 2030 with silicon dioxide for layer 1210 as a function of frequency a/λ and a ratio of major axis to minor axis of about 2.236 for ellipses 2095, 2021 and 2022.

In FIG. 21a, solid line 2110 shows the power before waveguide bend 2030 and dashed line 2120 shows the power after waveguide bend 2030 where ellipses 2095, 2021 and 2022 have a minor axis of about 0.66a. Comparing solid line 2110 with dashed line 2120 shows that transmission is poor for most frequencies.

In FIG. 21b, solid line 2111 shows the power before waveguide bend 2030 and dashed line 2121 shows the power after waveguide bend 2030 where ellipses 2095, 2021 and 2022 have a minor axis of about 0.7a. Comparing solid line 2111 with dashed line 2121 shows that transmission is poor for most frequencies.

In FIG. 21c, solid line 2112 shows the power before waveguide bend 2030 and dashed line 2122 shows the power after waveguide bend 2030 where ellipses 2095, 2021 and 2022 have a minor axis of about 0.74a. Comparing solid line 2112 with dashed line 2122 shows that transmission is poor for most frequencies.

Figure 22A:
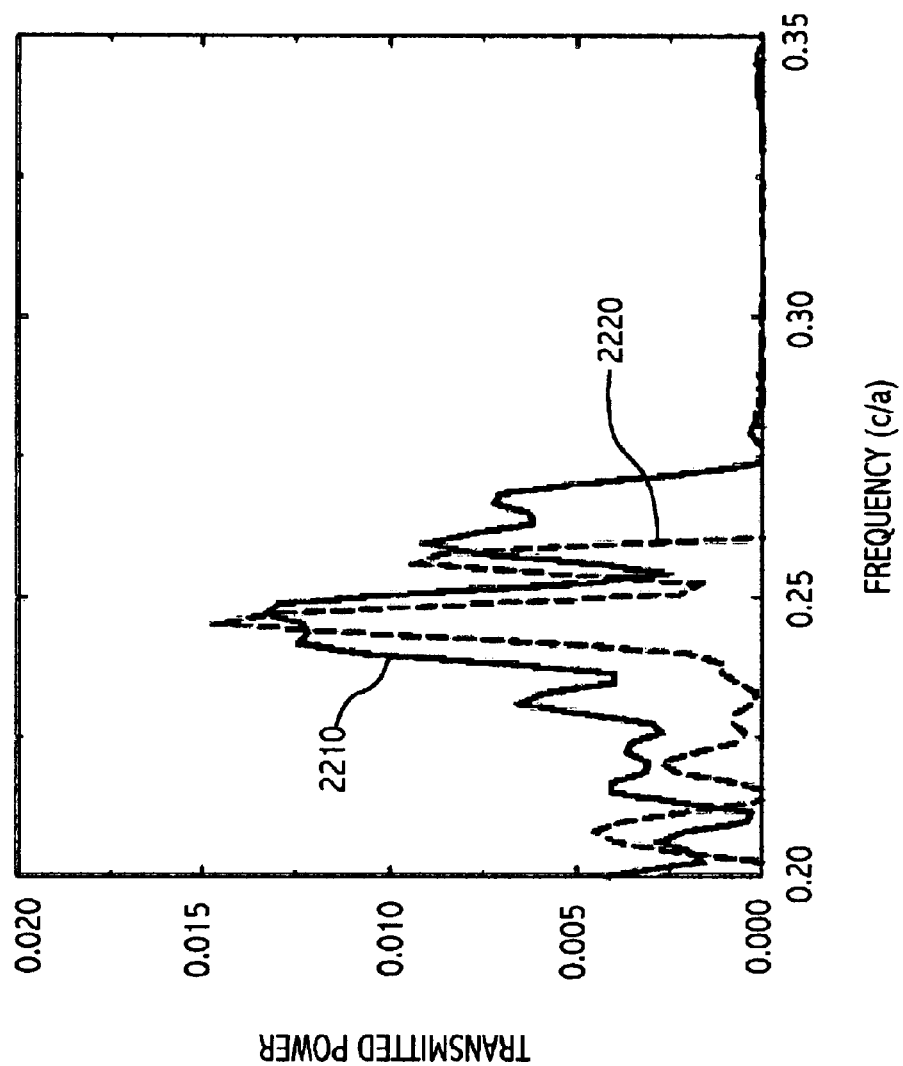
FIG. 22a shows a transmission versus frequency graph for a two-dimensional photonic crystal slab apparatus in accordance with the invention.
Figure 22B:
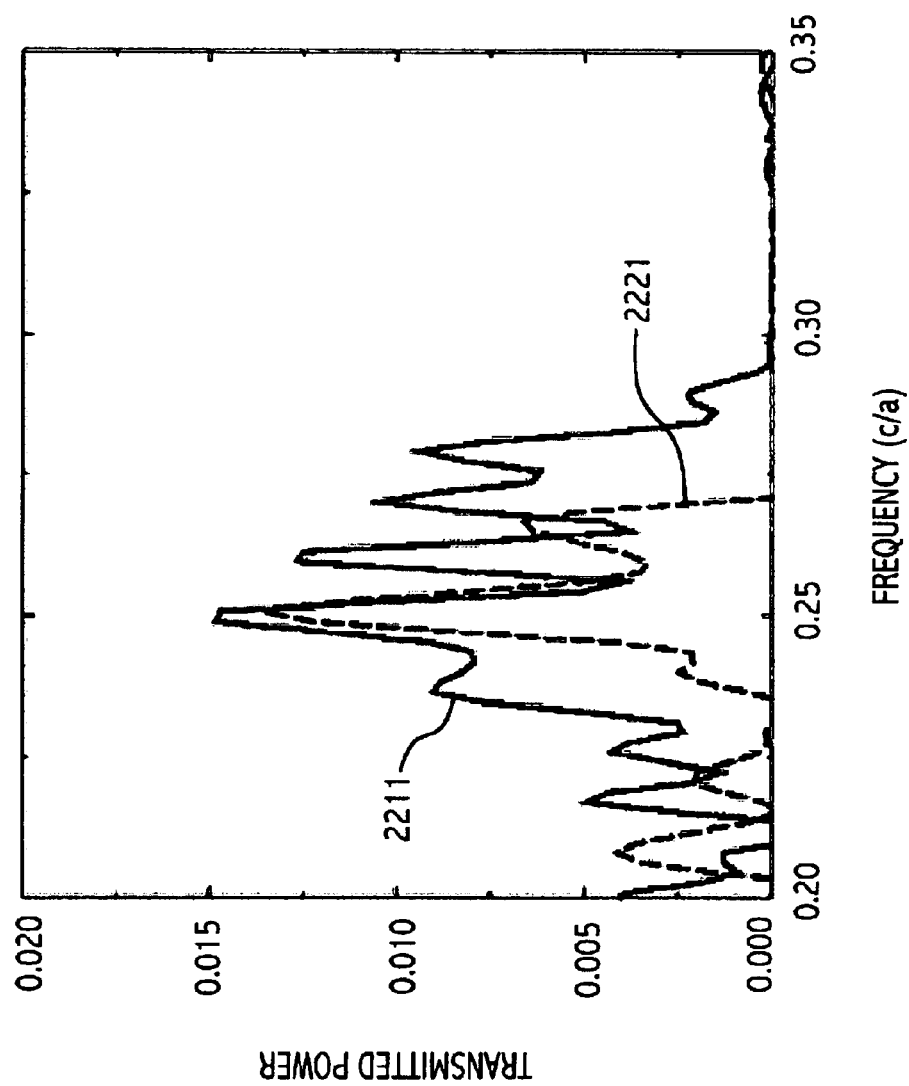
FIG. 22b shows a transmission versus frequency graph for a two-dimensional photonic crystal slab apparatus in accordance with the invention.
Figure 22C:
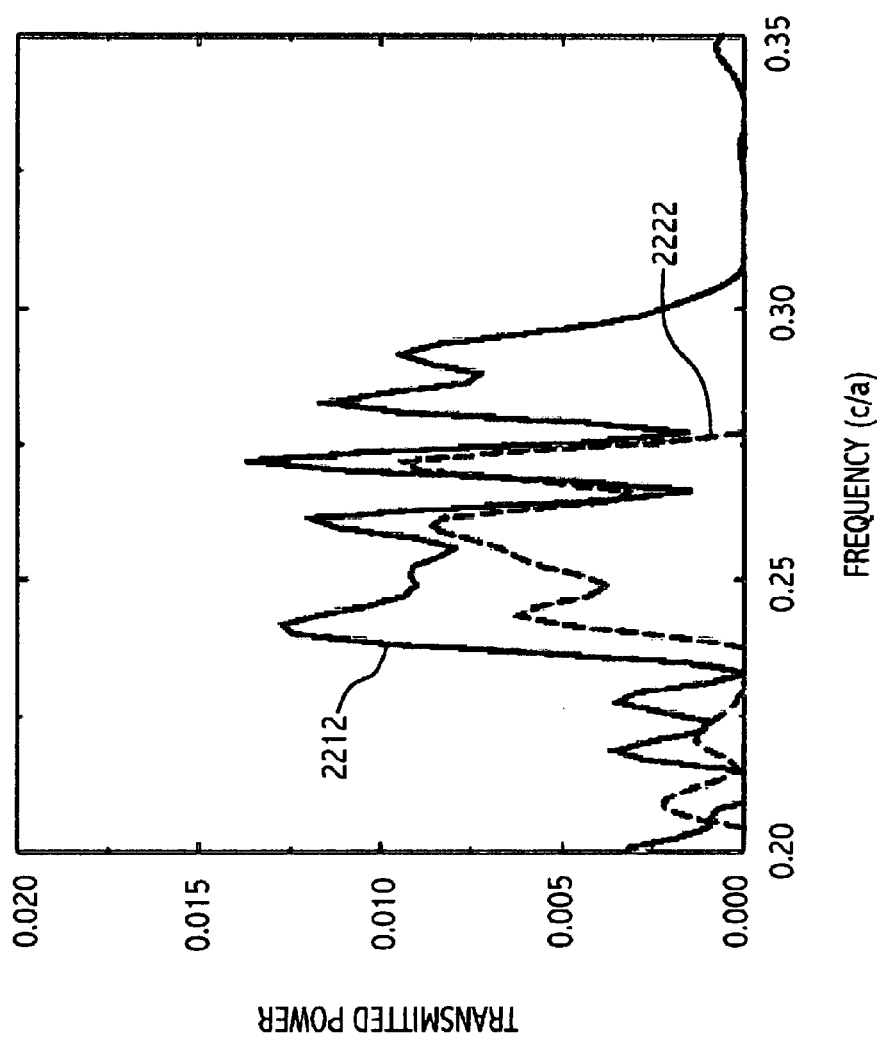
FIG. 22c shows a transmission versus frequency graph for a two-dimensional photonic crystal slab apparatus in accordance with the invention.

FIGS. 22a–c show the transmitted power before and after waveguide bend 2030 with air for layer 1210 and a ratio of major axis to minor axis of about 2.236 for ellipses 2095, 2021 and 2022.

In FIG. 22a, solid line 2210 shows the power before waveguide bend 2030 and dashed line 2220 shows the power after waveguide bend 2030 where ellipses 2095, 2021 and 2022 have a minor axis of about 0.66a.

In FIG. 22b, solid line 2211 shows the power before waveguide bend 2030 and dashed line 2221 shows the power after waveguide bend 2030 where ellipses 2095, 2021 and 2022 have a minor axis of about 0.7a.

In FIG. 22c, solid line 2212 shows the power before waveguide bend 2030 and dashed line 2222 shows the power after waveguide bend 2030 where ellipses 2095, 2021 and 2022 have a minor axis of about 0.74a.

Comparing FIGS. 22a–c to FIGS. 21a–c it is apparent that better transmission is obtained with air for layer 1210 with the example in FIG. 22a yielding the best result. The embodiment in accordance with the invention in FIG. 22a has the widest operating frequency, about 7% of the mid-frequency, with transmission better than 80%.

Figure 23:
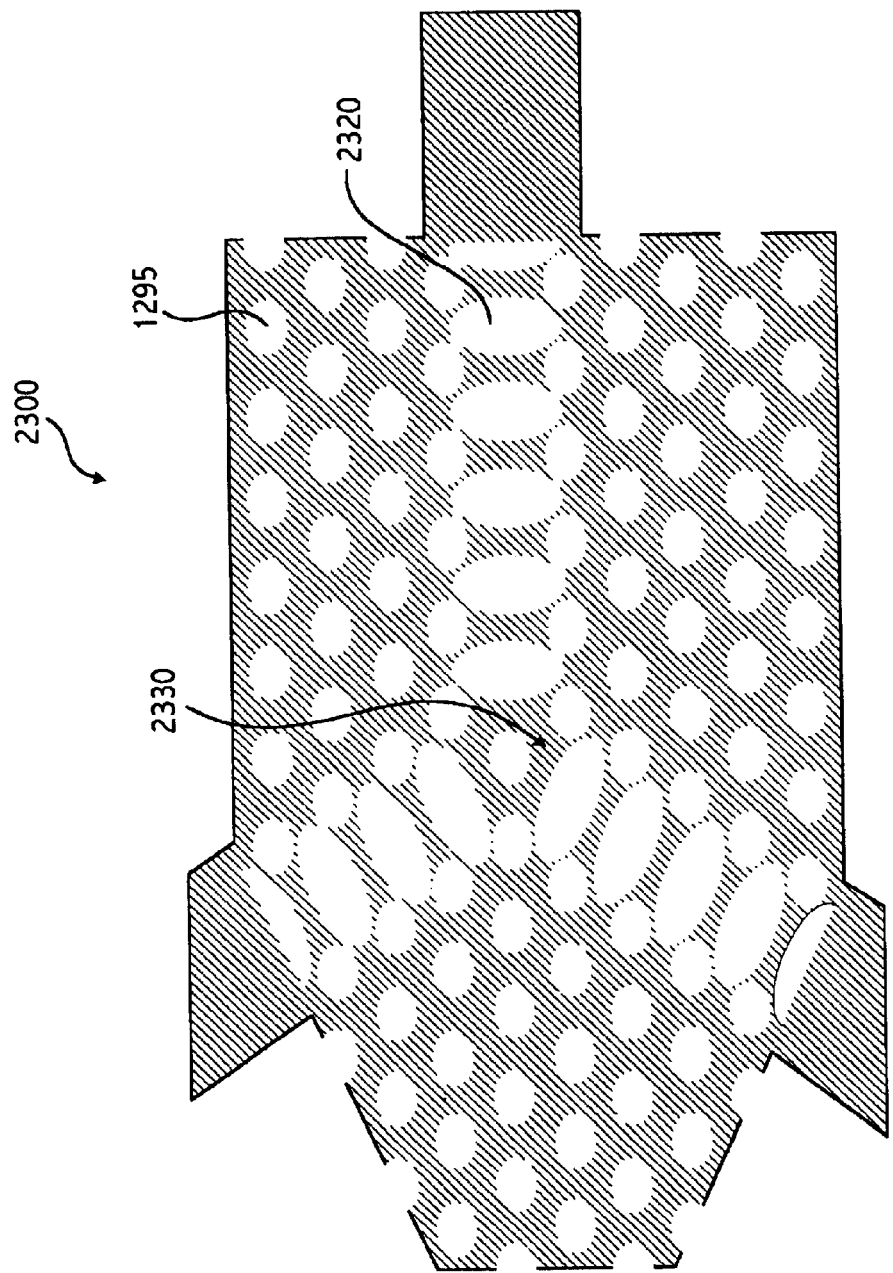
FIG. 23 shows an xy plane cross section with beam splitter of a photonic crystal slab apparatus in accordance with the invention.

FIG. 23 shows photonic crystal lattice 2300 in a waveguide splitter configuration. The width of the guided band over the mid-frequency increases as the minor axis of ellipses 2320 is increased. FIG. 23 shows photonic crystal lattice 2300 in accordance with the invention where no lattice defect is introduced at waveguide splitter 2330. However, power transmission through waveguide splitter 2330 decreases as the minor axis of ellipses 1820 is increased because of leakage of waves into the region outside of the high index core.

Figure 24A:
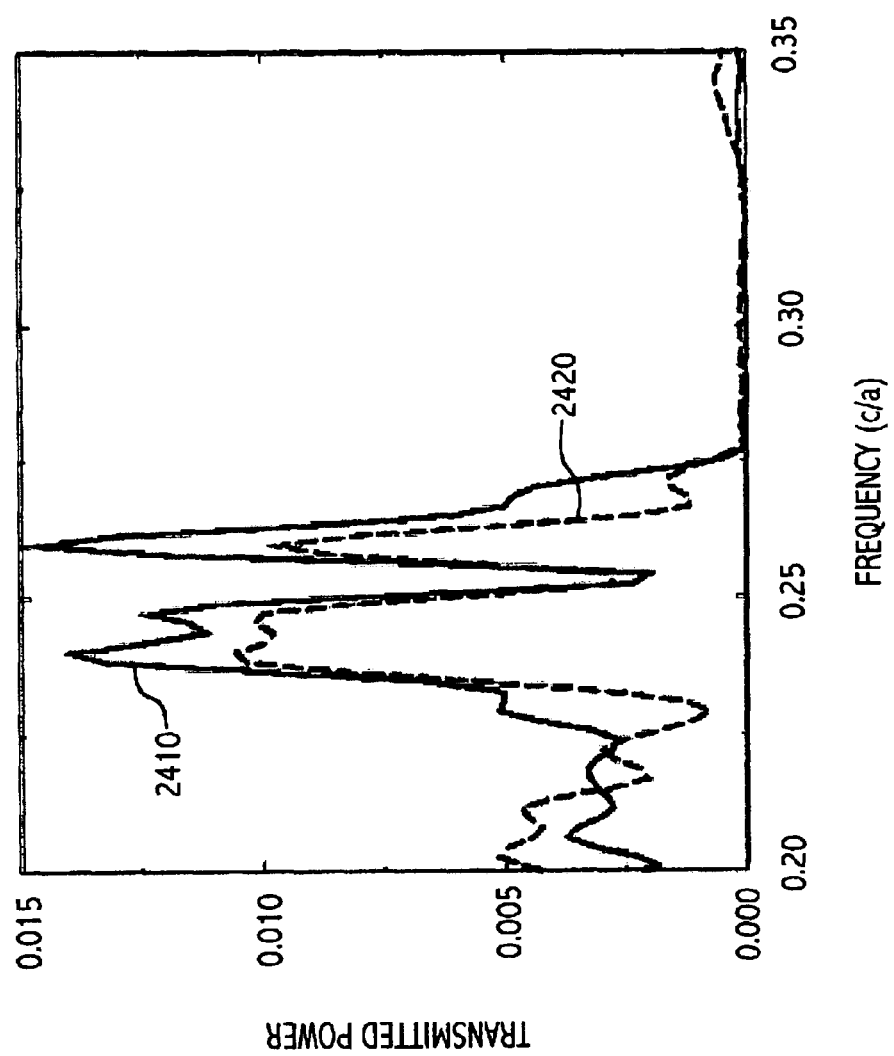
FIG. 24a shows a transmission versus frequency graph for a two-dimensional photonic crystal slab apparatus in accordance with the invention.
Figure 24B:
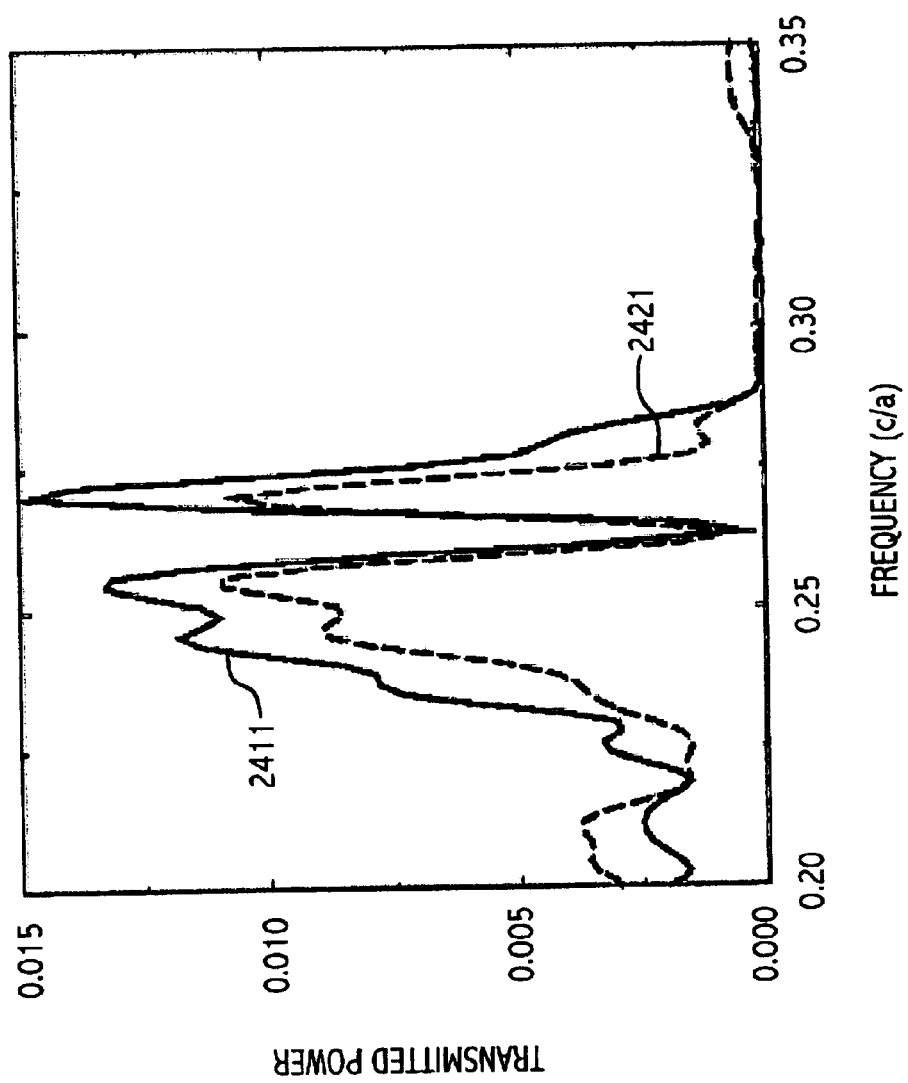
FIG. 24b shows a transmission versus frequency graph for a two-dimensional photonic crystal slab apparatus in accordance with the invention.
Figure 24C:
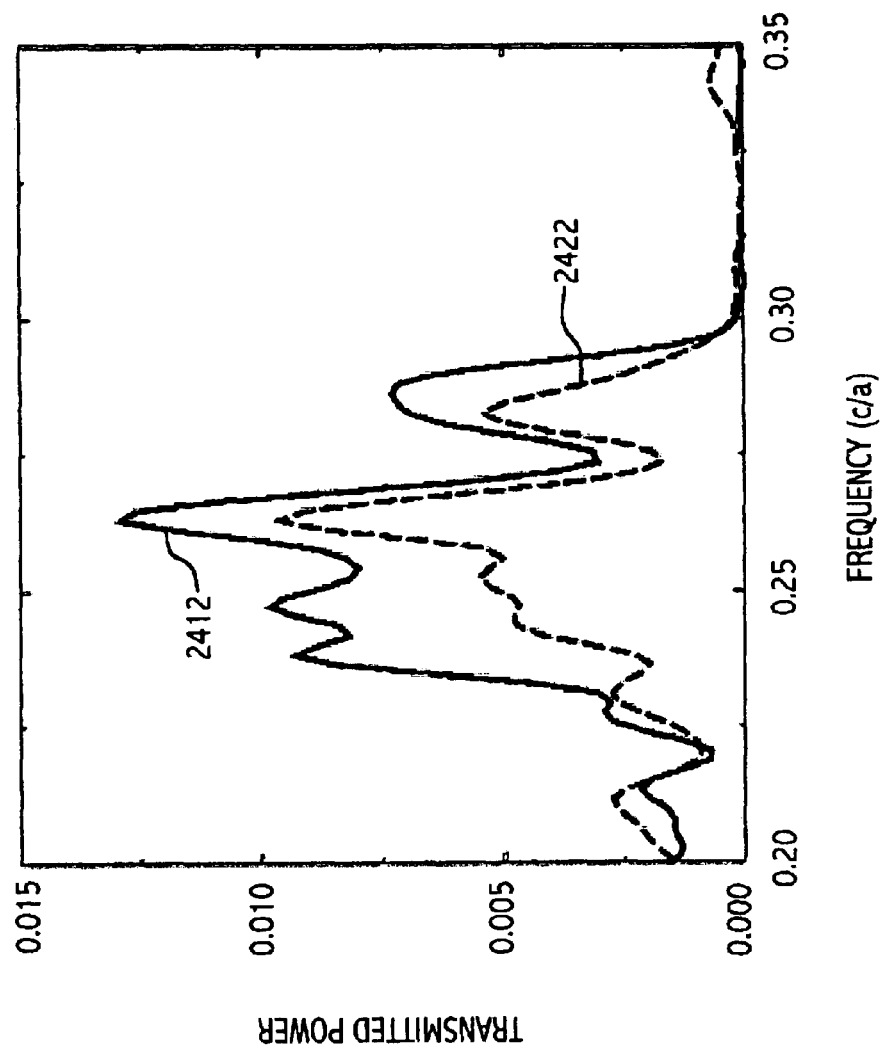
FIG. 24c shows a transmission versus frequency graph for a two-dimensional photonic crystal slab apparatus in accordance with the invention.

FIGS. 24a–c are taken to have a dielectric constant of about 2 for layer 1210 (see FIG. 12). In FIGS. 24a–c, solid lines 2410, 2411 and 2412 represent the power before waveguide splitter 2330 and dashed lines 2420, 2421 and 2422 represent the power after waveguide splitter 2330, respectively. FIG. 24a has a minor axis of 0.66a for ellipses 1820. FIG. 24b has a minor axis of 0.7a for ellipses 1820. FIG. 24c has a minor axis of 0.74a for ellipses 1820. FIGS. 24a and 24b are similar. For the embodiment corresponding to FIG. 24b, power transmission averages about 80% for frequencies a/λ≈0.24–0.275. The width for the guided mode increases to a/λ≈0.245–0.285 for the embodiment corresponding to FIG. 24c but the average power transmission decreases to 55%.

Figure 25A:
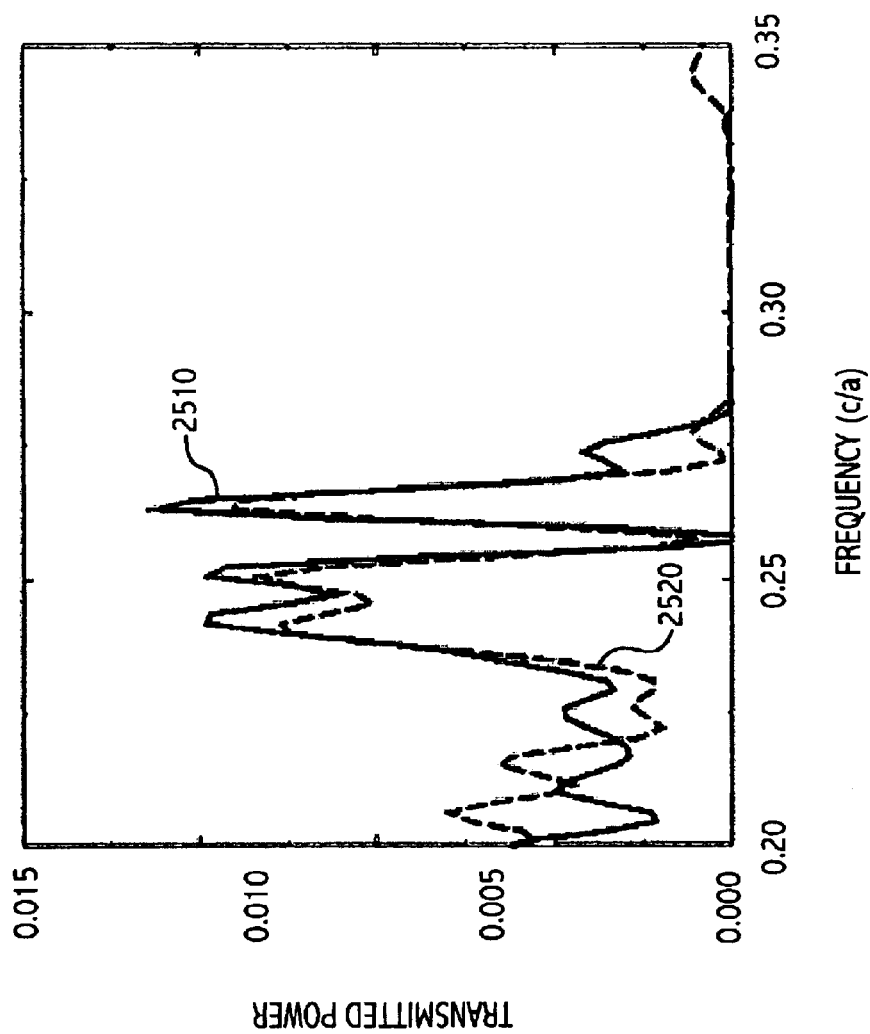
FIG. 25a shows a transmission versus frequency graph for a two-dimensional photonic crystal slab apparatus in accordance with the invention.
Figure 25B:
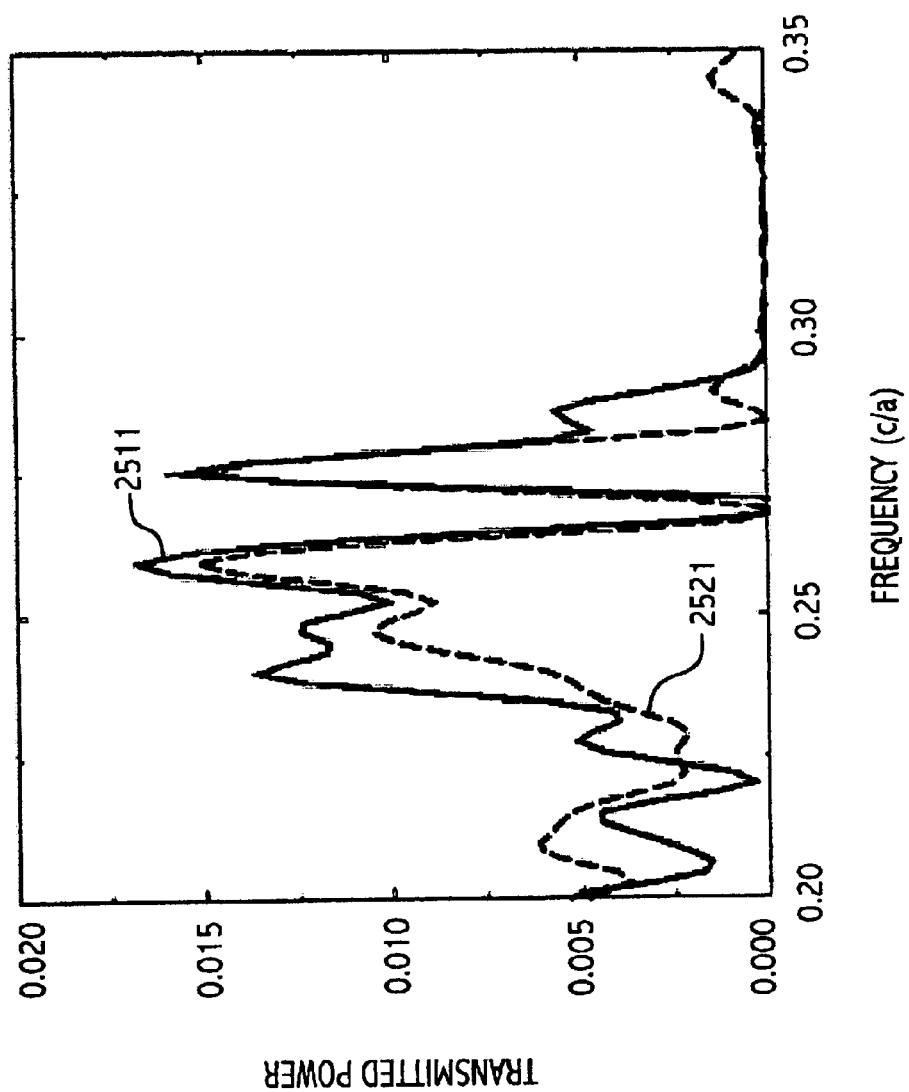
FIG. 25b shows a transmission versus frequency graph for a two-dimensional photonic crystal slab apparatus in accordance with the invention.
Figure 25C:
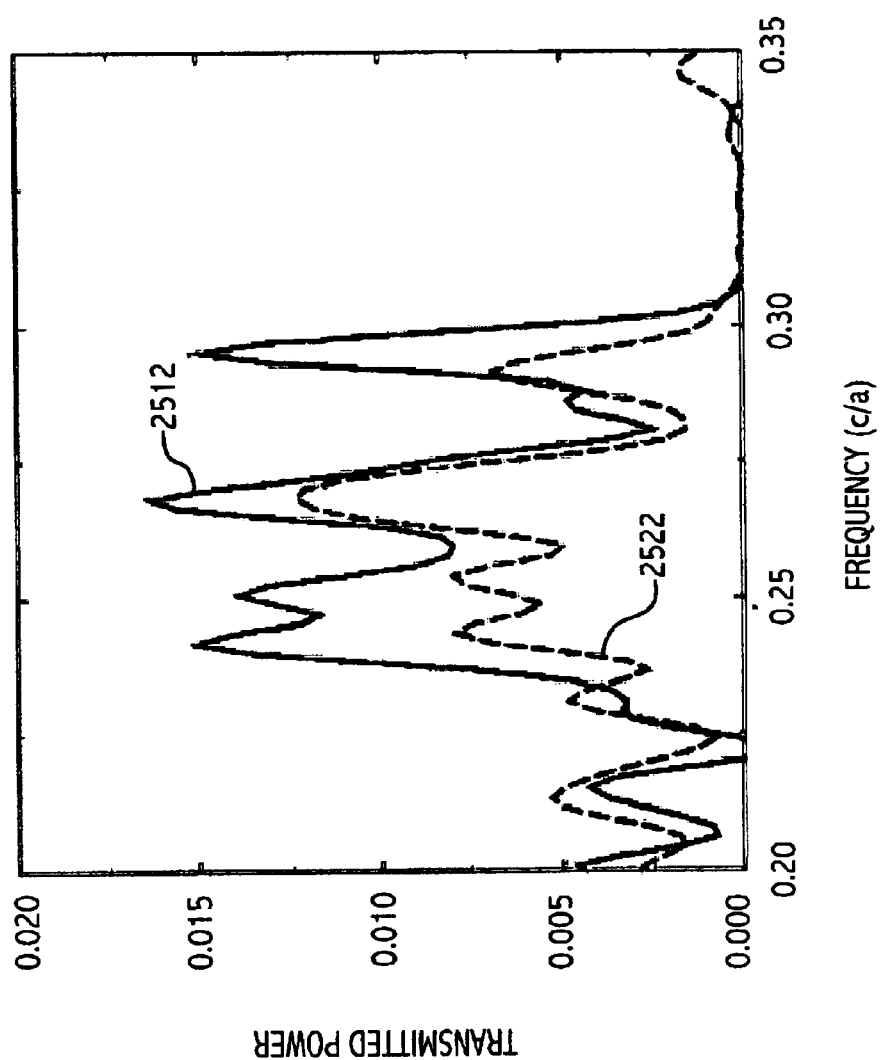
FIG. 25c shows a transmission versus frequency graph for a two-dimensional photonic crystal slab apparatus in accordance with the invention.

If the dielectric constant for layer 1210 is taken to be 1 and all other parameters remain the same as in FIGS. 24a–c, the width of the guided band changes little for the embodiments corresponding as shown in FIGS. 25a–c but the power transmission is considerably improved. In FIGS. 25a–c, solid lines 2510, 2511 and 2512 represent the power before waveguide splitter 2330 and dashed lines 2520, 2521 and 2522 represent the power after waveguide splitter 2330, respectively. For the embodiments in FIGS. 25b and 25c corresponding to FIGS. 24b and 24c the average power transmission increases to 90% and 65%, respectively.

For waveguide bends and waveguide splitters the introduction of ellipses as lattice defects gives better power transmission for ellipses with a smaller minor axis at the cost of narrower width waveguide modes. A larger minor axis reduces the average power transmission because of losses outside of the core layer. Reducing the dielectric constant of layer 1210 improves power transmission, particularly for choices of larger values for the minor axis for the ellipse because leakage outside the core is reduced.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

I claim:

1. A two-dimensional photonic crystal slab structure comprising:
   a photonic crystal slab comprising a two-dimensional periodic lattice of substantially circular holes with a lattice constant;
   a first line of defects defining a first waveguide portion in said two-dimensional periodic lattice, said first line of defects comprising holes having a substantially non-circular cross-section, said holes having a size and arrangement such that said holes do not physically contact said circular holes; and
   a second line of defects defining a second waveguide portion in said two dimensional periodic lattice, said second waveguide portion proximate to and oriented at an angle with respect to said first waveguide portion such that an electromagnetic wave propagating in a first direction along said first line of defects is caused to propagate in a second direction along said second line of defects wherein said second direction is oriented at said angle with respect to said first direction.

2. The apparatus of claim 1 wherein said substantially non-circular cross-section is an ellipse.

3. The apparatus of claim 1 wherein said substantially circular holes each have a radius that is about 0.3 of said lattice constant.

4. The apparatus of claim 1 wherein said angle is about 60 degrees.

5. The apparatus of claim 2 wherein said ellipse has a major axis and a minor axis such that the ratio of said major axis to said minor axis is between about 2.2 and 2.3.

6. The apparatus of claim 1 wherein said substantially circular holes have a first and second end, said first end being bounded by air.

7. The apparatus of claim 6 wherein said second end is bounded by air.

8. The apparatus of claim 1 wherein said photonic crystal slab is comprised of silicon.

9. The apparatus of claim 1 wherein said two-dimensional periodic lattice is a triangular lattice.

10. The apparatus of claim 1 wherein said second line of defects is coupled to a conventional waveguide and a portion of said photonic crystal slab proximate to said conventional waveguide is cut away.

11. The apparatus of claim 1 wherein said second line of defects is coupled to said first line of defects by a defect free region of said two-dimensional periodic lattice.

12. A two-dimensional photonic crystal slab structure comprising:
    a photonic crystal slab comprising a two-dimensional periodic lattice of substantially circular holes with a lattice constant;
    a first line of defects defining a first waveguide portion in said two-dimensional periodic lattice, said first line of defects comprising holes having a substantially non-circular cross-section, said holes having a size and arrangement such that said holes do not physically contact said circular holes;
    a second line of defects defining a second waveguide portion in said two dimensional periodic lattice, said second waveguide portion proximate to and oriented at a first angle with respect to said first waveguide portion such that an electromagnetic wave propagating in a first direction along said first line of defects is caused to propagate in a second direction along said second line of defects wherein said second direction is oriented at said first angle with respect to said first direction; and
    a third line of defects defining a third waveguide portion in said two dimensional periodic lattice, said third waveguide portion proximate to and oriented at a second angle with respect to said first waveguide portion such that an electromagnetic wave propagating in a first direction along said first line of defects is caused to propagate in a third direction along said third line of defects wherein said third direction is oriented at said second angle with respect to said first direction.

13. The apparatus of claim 12 wherein said substantially non-circular cross-section is an ellipse.

14. The apparatus of claim 12 wherein said substantially circular holes each have a radius that is about 0.3 of said lattice constant.

15. The apparatus of claim 12 wherein said first angle is about 60 degrees.

16. The apparatus of claim 13 wherein said ellipse has a major axis and a minor axis such that the ratio of said major axis to said minor axis is between about 2.2 and 2.3.

17. The apparatus of claim 12 wherein said substantially circular holes have a first and second end, said first end being bounded by air.

18. The apparatus of claim 17 wherein said second end is bounded by air.

19. The apparatus of claim 12 wherein said photonic crystal slab is comprised of silicon.

20. The apparatus of claim 12 wherein said first line of defects is coupled to said second and said third line of defects by a defect free region of said two-dimensional periodic lattice.

* * * * *